US011268602B2

(12) United States Patent
Zhu et al.

(10) Patent No.: US 11,268,602 B2
(45) Date of Patent: Mar. 8, 2022

(54) MULTI-MODE CONTINUOUSLY VARIABLE TRANSMISSION WITH BOTH SPEED COUPLING AND TORQUE COUPLING

(71) Applicant: JIANGSU UNIVERSITY, Zhenjiang (CN)

(72) Inventors: Zhen Zhu, Zhenjiang (CN); Longhui Lai, Zhenjiang (CN); Yingfeng Cai, Zhenjiang (CN); Juncheng Wang, Zhenjiang (CN); Jiangyi Han, Zhenjiang (CN); Jianguo Zhu, Zhenjiang (CN); Rong Zou, Zhenjiang (CN); Dehua Shi, Zhenjiang (CN); Xing Xu, Zhenjiang (CN); Yulin Deng, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/415,716

(22) PCT Filed: Aug. 14, 2020

(86) PCT No.: PCT/CN2020/109153
§ 371 (c)(1),
(2) Date: Jun. 17, 2021

(65) Prior Publication Data
US 2022/0042584 A1 Feb. 10, 2022

(30) Foreign Application Priority Data
Aug. 3, 2020 (CN) .......................... 202010766107.2

(51) Int. Cl.
*F16H 37/02* (2006.01)
*F16H 37/08* (2006.01)
(Continued)

(52) U.S. Cl.
CPC .......... *F16H 37/022* (2013.01); *B60K 6/543* (2013.01); *B60K 6/547* (2013.01); *F16H 37/086* (2013.01);
(Continued)

(58) Field of Classification Search
None
See application file for complete search history.

(56) References Cited

U.S. PATENT DOCUMENTS 5,669,842 A 9/1997 Schmidt
9,394,975 B1 * 7/2016 Calvert ................... F16H 3/725
(Continued)

FOREIGN PATENT DOCUMENTS

CN 102359567 A 2/2012
CN 107859722 A 3/2018
(Continued)

*Primary Examiner* — Colby M Hansen
(74) *Attorney, Agent, or Firm* — Bayramoglu Law Offices LLC

(57) ABSTRACT

A multi-mode continuously variable transmission with both speed coupling and torque coupling includes an engine-power input assembly, a hydraulic transmission assembly, a motor transmission assembly, a planetary gear assembly, an output member, a clutch assembly, and a brake assembly, wherein an output end of the planetary gear assembly is connected to the output member, the clutch assembly connects the engine-power input assembly, the hydraulic transmission assembly, and the motor transmission assembly to an input end of the planetary gear assembly, and the clutch assembly connects the engine-power input assembly to the hydraulic transmission assembly; and the clutch assembly and the brake assembly provide a continuously changing transmission ratio between the engine-power input assembly or/and the motor transmission assembly and the output member.

8 Claims, 18 Drawing Sheets

(51) Int. Cl.
  *B60K 6/543* (2007.10)
  *B60K 6/547* (2007.10)
  *B60K 6/46* (2007.10)
(52) U.S. Cl.
  CPC ........ *B60K 6/46* (2013.01); *F16H 2037/0886* (2013.01); *F16H 2200/2015* (2013.01)

(56) References Cited

U.S. PATENT DOCUMENTS

| | | | |
|---|---|---|---|
| 2008/0234089 A1* | 9/2008 | Prebeck | F16H 47/04 475/83 |
| 2010/0125019 A1* | 5/2010 | Tabata | B60W 10/115 477/3 |
| 2013/0005524 A1 | 1/2013 | Waugh | |
| 2016/0109006 A1* | 4/2016 | Schoolcraft | F16H 15/52 475/185 |

FOREIGN PATENT DOCUMENTS

| | | |
|---|---|---|
| CN | 108825747 A | 11/2018 |
| CN | 109185417 A | 1/2019 |
| CN | 111237424 A | 6/2020 |

* cited by examiner

MULTI-MODE CONTINUOUSLY VARIABLE TRANSMISSION WITH BOTH SPEED COUPLING AND TORQUE COUPLING

CROSS REFERENCE TO THE RELATED APPLICATIONS

This application is the national stage entry of International Application No. PCT/CN2020/109153, filed on Dec. Aug. 14, 2020, which is based upon and claims priority to Chinese Patent Application No. 202010766107.2 filed on Aug. 3, 2020, the entire contents of which are incorporated herein by reference.

TECHNICAL FIELD

The present invention relates to the field of vehicle variable transmission, and in particular, to a multi-mode continuously variable transmission with both speed coupling and torque coupling.

BACKGROUND

China is a large energy-consuming country with a shortage of oil resources, most of which are consumed by vehicles. As countries around the world pay more and more attention to energy conservation and emission reduction, fuel-saving solutions for agricultural machinery are increasingly highlighted. Since the running conditions of agricultural machinery at work are worse than those of road vehicles and sudden increases in resistance usually occur, low-power agricultural machinery often has to sacrifice certain operating efficiency to overcome these extreme conditions, and fuel consumption will increase consequently; while high-power agricultural machinery has problems such as high cost and large size, and the problem of excess power exists under relatively good operating conditions. The present invention proposes a multi-mode continuously variable transmission with both speed coupling and torque coupling to solve the above technical problems.

SUMMARY

To eliminate the defects in the prior art, the present invention provides a multi-mode continuously variable transmission with both speed coupling and torque coupling, which can realize optimal power matching of a power source and a preferred combination of power output manners through engagement/disengagement of a clutch assembly and a brake assembly and through adjustment of a displacement ratio of a hydraulic transmission assembly and the speed/torque of a motor.

The present invention achieves the above objective through the following technical solution.

A multi-mode continuously variable transmission with both speed coupling and torque coupling includes an engine-power input assembly, a hydraulic transmission assembly, a motor transmission assembly, a planetary gear assembly, an output member, a clutch assembly, and a brake assembly, wherein the planetary gear assembly includes five planetary gear trains, an output end of the planetary gear assembly is connected to the output member, the clutch assembly connects the engine-power input assembly, the hydraulic transmission assembly, and the motor transmission assembly to an input end of the planetary gear assembly, and the clutch assembly connects the engine-power input assembly to the hydraulic transmission assembly; and the clutch assembly and the brake assembly provide a continuously changing transmission ratio between the engine-power input assembly or/and the motor transmission assembly and the output member.

Further, the planetary gear assembly includes a first planetary gear mechanism, a second planetary gear mechanism, a third planetary gear mechanism, a fourth planetary gear mechanism, and a fifth planetary gear mechanism, wherein a ring gear of the first planetary gear mechanism is connected to a ring gear of the second planetary gear mechanism; a sun gear of the second planetary gear mechanism is connected to an output end of the hydraulic transmission assembly, and a planet carrier of the second planetary gear mechanism is connected to a ring gear of the third planetary gear mechanism; the ring gear of the third planetary gear mechanism is connected to a sun gear of the fourth planetary gear mechanism, and a planet carrier of the third planetary gear mechanism is connected to a planet carrier of the fourth planetary gear mechanism; a ring gear of the fourth planetary gear mechanism is connected to a ring gear of the fifth planetary gear mechanism; and a planet carrier of the fifth planetary gear mechanism is connected to the output member.

Further, transmission triodes including hydraulic transmission, mechanical transmission, and hydro-mechanical transmission are provided between the engine-power input assembly and the output member by adjusting a displacement ratio of the hydraulic transmission assembly and selectively controlling engagement of the clutch assembly and the brake assembly;

mechanical transmission is provided between the motor transmission assembly and the output member by selectively controlling engagement of the clutch assembly and the brake assembly;

transmission modes including mechanical transmission and hydro-mechanical transmission are provided between the engine-power input assembly as well as the motor transmission assembly and the output member by adjusting the displacement ratio of the hydraulic transmission assembly and selectively controlling engagement of the clutch assembly and the brake assembly.

Further, the clutch assembly includes a second clutch $C_2$ and a fifth clutch $C_5$, wherein the second clutch $C_2$ is used for selectively connecting an output end of the motor transmission assembly to a planet carrier of the first planetary gear mechanism to achieve synchronous rotation, and the fifth clutch $C_5$ is used for selectively connecting a sun gear of the third planetary gear mechanism to the ring gear of the third planetary gear mechanism to achieve synchronous rotation; the brake assembly includes a first brake $B_1$, a third brake $B_3$, and a sixth brake $B_6$, wherein the first brake $B_1$ is used for selectively connecting a sun gear of the first planetary gear mechanism to a fixed member, the third brake $B_3$ is used for selectively connecting the sun gear of the second planetary gear mechanism to the fixed member, and the sixth brake $B_6$ is used for selectively connecting a sun gear of the fifth planetary gear mechanism to the fixed member;

forward or reverse mechanical transmission is provided between the motor transmission assembly and the output member by adjusting speed/torque of a motor and selectively controlling engagement of the second clutch $C_2$, the fifth clutch $C_5$, the first brake $B_1$, the third brake $B_3$, and the sixth brake $B_6$.

Further, the clutch assembly further includes a first clutch $C_1$ and a third clutch $C_3$, wherein the first clutch $C_1$ is used for selectively connecting an output end of the engine-power input assembly to the planet carrier of the first planetary gear mechanism to achieve synchronous rotation, and the third clutch $C_3$ is used for selectively connecting the output end of the engine-power input assembly to an input end of the hydraulic transmission assembly to achieve synchronous rotation; the brake assembly further includes a second brake $B_2$, a fourth brake $B_4$, and a fifth brake $B_5$, wherein the second brake $B_2$ is used for selectively connecting the ring gear of the first planetary gear mechanism to the fixed member, the fourth brake $B_4$ is used for selectively connecting the sun gear of the third planetary gear mechanism to the fixed member, and the fifth brake $B_5$ is used for selectively connecting the planet carrier of the third planetary gear mechanism to the fixed member;

forward hydraulic transmission is provided between the engine-power input assembly and the output member by adjusting the displacement ratio of the hydraulic transmission assembly and engaging the first clutch the third clutch $C_3$, the second brake $B_2$, the fifth brake $B_5$, and the sixth brake $B_6$;

reverse hydraulic transmission is provided between the engine-power input assembly and the output member by adjusting the displacement ratio of the hydraulic transmission assembly and engaging the first clutch $C_3$, the third clutch $C_3$, the second brake $B_2$, the fourth brake $B_4$, and the sixth brake $B_6$, or engaging the first clutch $C_1$, the third clutch $C_3$, the fifth clutch $C_5$, the second brake $B_2$, and the sixth brake $B_6$;

different forward hydro-mechanical transmission is provided between the engine-power input assembly and the output member by adjusting the displacement ratio of the hydraulic transmission assembly and engaging the first clutch the third clutch $C_3$, the first brake $B_1$, the fourth brake 134, and the sixth brake $B_6$, or engaging the first clutch $C_1$, the third clutch $C_3$, the fifth clutch $C_5$, the first brake $B_1$, and the sixth brake $B_6$;

reverse hydro-mechanical transmission is provided between the engine-power input assembly and the output member by adjusting the displacement ratio of the hydraulic transmission assembly and engaging the first clutch $C_1$, the third clutch $C_3$, the first brake $B_1$, the fifth brake $B_5$, and the sixth brake $B_6$;

different forward mechanical transmission is provided between the engine-power input assembly and the output member by engaging the first clutch $C_1$, the first brake $B_1$, the third brake $B_3$, the fourth brake $B_4$, and the sixth brake $B_6$, or engaging the first clutch $C_1$, the fifth clutch $C_5$, the first brake $B_1$, the third brake $B_3$, and the sixth brake $B_6$;

reverse mechanical transmission is provided between the engine-power input assembly and the output member by engaging the first clutch $C_1$, the first brake $B_1$, the third brake $B_3$, the fifth brake $B_5$, and the sixth brake $B_6$.

Further, different forward torque coupling-hydro-mechanical transmission is provided between the engine-power input assembly as well as the motor transmission assembly and the output member by adjusting the displacement ratio of the hydraulic transmission assembly and torque of the motor and engaging the first clutch $C_1$, the second clutch $C_2$, the third clutch $C_3$, the first brake $B_1$, the fourth brake $B_4$, and the sixth brake $B_6$, or engaging the first clutch $C_1$, the second clutch $C_2$, the third clutch $C_3$, the fifth clutch $C_5$, the first brake $B_1$, and the sixth brake $B_6$;

reverse torque coupling-hydro-mechanical transmission is provided between the engine-power input assembly as well as the motor transmission assembly and the output member by adjusting the displacement ratio of the hydraulic transmission assembly and torque of the motor and engaging the first clutch $C_1$, the second clutch $C_2$, the third clutch $C_3$, the first brake $B_1$, the fifth brake $B_5$, and the sixth brake $B_6$;

different forward torque coupling-mechanical transmission is provided between the engine-power input assembly as well as the motor transmission assembly and the output member by adjusting torque of the motor and engaging the first clutch $C_4$, the second clutch $C_2$, the first brake the third brake $B_3$, the fourth brake $B_4$, and the sixth brake $B_6$, or engaging the first clutch $C_1$, the second clutch $C_2$, the fifth clutch $C_5$, the first brake $B_1$, the third brake $B_3$, and the sixth brake $B_6$;

reverse torque coupling-mechanical transmission is provided between the engine-power input assembly as web as the motor transmission assembly and the output member by adjusting torque of the motor and engaging the first clutch $C_1$, the second clutch $C_2$, the first brake $B_1$, the third brake $B_3$, the fifth brake $B_5$, and the sixth brake $B_6$.

Further, the clutch assembly further includes a fourth clutch $C_4$, wherein the fourth clutch $C_4$ is used for selectively connecting the output end of the motor transmission assembly to the sun gear of the first planetary gear mechanism to achieve synchronous rotation;

different forward low-speed coupling-hydro-mechanical transmission is provided between the engine-power input assembly as well as the motor transmission assembly and the output member by adjusting the displacement ratio of the hydraulic transmission assembly and speed of the motor and engaging the first clutch $C_1$, the third clutch $C_3$, the fourth clutch $C_4$, the fourth brake $B_4$, and the sixth brake $B_6$, or engaging the first clutch the third clutch $C_3$, the fourth clutch $C_4$, the fifth clutch $C_5$, and the sixth brake $B_6$;

reverse low-speed coupling-hydro-mechanical transmission is provided between the engine-power input assembly as well as the motor transmission assembly and the output member by adjusting the displacement ratio of the hydraulic transmission assembly and speed of the motor and engaging the first clutch $C_1$, the third clutch $C_3$, the fourth clutch $C_4$, the fifth brake $B_5$, and the sixth brake $B_6$;

different forward low-speed coupling-mechanical transmission is provided between the engine-power input assembly as well as the motor transmission assembly and the output member by adjusting speed of the motor and engaging the first clutch $C_1$, the fourth clutch $C_4$, the third brake $B_3$, the fourth brake $B_4$, and the sixth brake $B_6$, or engaging the first clutch $C_1$, the fourth clutch $C_4$, the fifth clutch $C_5$, the third brake $B_3$, and the sixth brake $B_6$;

reverse low-speed coupling-mechanical transmission is provided between the engine-power input assembly as well as the motor transmission assembly and the output member by adjusting speed of the motor and engaging the first clutch $C_1$, the fourth clutch $C_4$, the third brake $B_3$, the fifth brake $B_5$, and the sixth brake $B_6$.

Further, the clutch assembly further chides a sixth clutch $C_6$, wherein the sixth clutch $C_6$ is used for selectively connecting the output end of the motor transmission assembly to the sun gear of the fifth planetary gear mechanism to achieve synchronous rotation;

different forward high-speed coupling-hydro-mechanical transmission is provided between the engine-power input assembly as well as the motor transmission assembly and the output member by adjusting the displacement ratio of the hydraulic transmission assembly and speed of the motor and engaging the first clutch $C_1$, the third clutch $C_3$, the sixth clutch $C_6$, the first brake $B_1$, and the fourth brake $B_4$, or engaging the first clutch $C_1$, the third clutch $C_3$, the fifth clutch $C_5$, the sixth clutch $C_6$, and the first brake $B_1$;

reverse high-speed coupling-hydro-mechanical transmission is provided between the engine-power input assembly as well as the motor transmission assembly and the output member by adjusting the displacement ratio of the hydraulic transmission assembly and speed of the motor and engaging the first clutch $C_1$, the third clutch $C_3$, the sixth clutch $C_6$, the first brake $B_1$, and the fifth brake $B_5$;

different forward high-speed coupling-mechanical transmission is provided between the engine-power input assembly as well as the motor transmission assembly and the output member by adjusting speed of the motor and engaging the first clutch $C_1$, the sixth clutch $C_6$, the first brake the third brake $B_3$, and the fourth brake $B_4$, or engaging the first clutch $C_1$, the fifth clutch $C_5$, the sixth clutch $C_6$, the first brake $B_1$, and the third brake $B_3$, reverse high-speed coupling-mechanical transmission is provided between the engine-power input assembly as well as the motor transmission assembly and the output member by adjusting speed of the motor and engaging the first clutch the sixth clutch $C_6$, the first brake $B_1$, the third brake $B_3$, and the fifth brake $B_5$.

Further, hydro-mechanical transmission between the engine-power input assembly and the output member is capable of being synchronously switched to hydro-mechanical transmission between the engine-power input assembly as well as the motor transmission assembly and the output member;

hydro-mechanical transmission between the engine-power input assembly as well as the motor transmission assembly and the output member is capable of being synchronously switched to mechanical transmission between the engine-power input assembly as well as the motor transmission assembly and the output member;

hydraulic transmission between the engine-power input assembly and the output member is capable of being synchronously switched to hydro-mechanical transmission between the engine-power input assembly and the output member, and hydro-mechanical transmission between the engine-power input assembly and the output member is capable of being synchronously switched to mechanical transmission between the engine-power input assembly and the output member.

The present invention has the following beneficial effects:

According to the multi-mode continuously variable transmission with both speed coupling and torque coupling of the present invention, any one of the transmission modes including hydraulic transmission, mechanical transmission, and hydro-mechanical transmission can be implemented by controlling the clutch assembly and the brake assembly. A continuous forward or reverse transmission ratio is provided between the input member and the output member by adjusting the displacement ratio of the hydraulic transmission assembly and/or the speed/torque of the motor. A plurality of planetary gear assemblies are adopted and are connected to the motor transmission assembly, the hydraulic transmission assembly, an input shaft, and an output shaft, thereby achieving a compact structure and reliable transmission. The motor and the engine are two power sources combined to expand the speed regulation range through speed coupling and to meet high-torque working conditions through torque coupling, thereby improving the transmission efficiency of the transmission system on the basis of meeting the power requirements. The switching from hydraulic transmission to hydro-mechanical transmission or from hydro-mechanical transmission to mechanical transmission can be implemented by selectively engaging the related clutch assembly and brake assembly and changing the displacement ratio of the hydraulic transmission assembly, to meet the power and fuel economy requirements of the transmission system.

1. engine-power input assembly; 1-1. engine; 1-2. first clutch $C_1$; 1-3. input shaft; 2. hydraulic transmission assembly; 2-1. hydraulic-power input gear pair; 2-2. third clutch $C_3$; 2-3. variable displacement pump; 2-4. quantitative motor; 2-5. hydraulic-power output gear pair; 3. motor transmission assembly; 3-1. storage battery; 3-2. second clutch $C_2$; 3-3. motor/generator; 3-4. controller; 3-5. motor-power output shaft; 3-6. front motor-power output gear pair; 3-7. middle motor-power transmission shaft; 3-8. sixth clutch $C_6$; 3-9. rear motor-power output gear pair; 4. first planetary gear mechanism; 4-1. fourth clutch $C_4$; 4-2. first brake $13_1$; 4-3. first planetary gear sun gear; 4-4. first planetary gear planet carrier; 4-5. second brake $B_2$; 4-6. first planetary gear ring gear; 5. second planetary gear mechanism; 5-1. third brake $B_3$; 5-2. second planetary gear planet carrier; 5-3. second planetary gear sun gear; 5-4. second planetary gear ring gear; 6—third planetary gear mechanism; 6-1. fifth clutch $C_5$; 6-2. fourth brake $B_4$; 6-3. third planetary gear sun gear; 6-4. third planetary gear planet carrier; 6-5. fifth brake $B_5$; 6-6. third planetary gear ring gear; 7. fourth planetary gear mechanism; 7-1. fourth planetary gear sun gear; 7-2. fourth planetary gear planet carrier; 7-3. fourth planetary gear ring gear; 8. fifth planetary gear mechanism; 8-1. fifth planetary gear ring gear; 8-2. fifth planetary gear planet carrier; 8-3. fifth planetary gear sun gear; 8-4. sixth brake $B_6$; 9. output shaft.

DETAILED DESCRIPTION OF THE EMBODIMENTS

The present invention is further described below with reference to the accompanying drawings and specific embodiments, but the protection scope of the present invention is not limited thereto.

Figure 1:
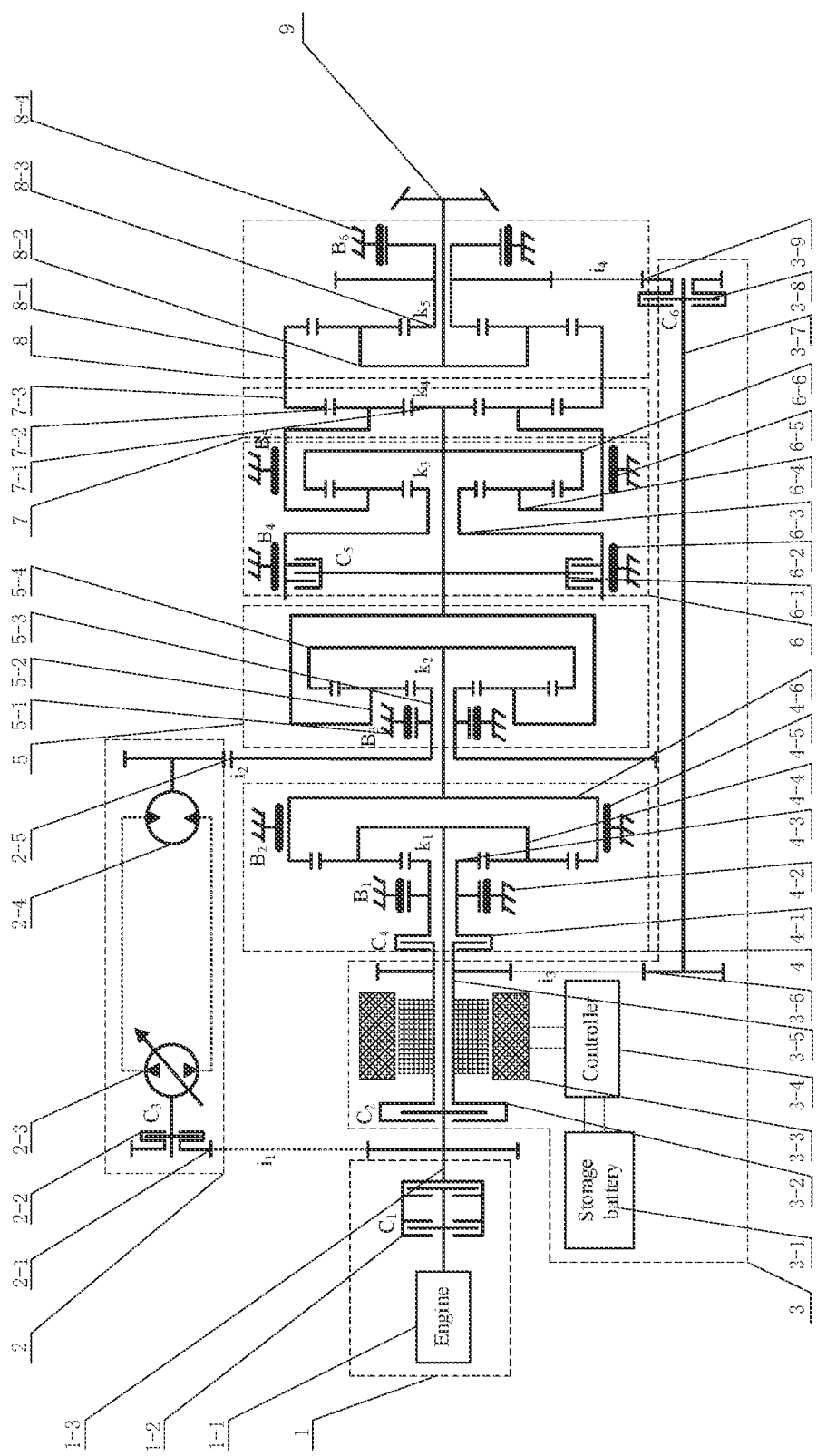
FIG. 1 is a diagram showing the principle of a multi-mode continuously variable transmission with both speed coupling and torque coupling of the present invention.

As shown in FIG. 1, a multi-mode continuously variable transmission with both speed coupling and torque coupling of the present invention includes an engine-power input assembly 1, a hydraulic transmission assembly 2, a motor transmission assembly 3, a planetary gear assembly, and an output shaft 9.

The input member includes an engine 1-1, a first clutch $C_1$ 1-2, and an input shaft 1-3. The input shaft 1-3 is connected to the engine 1-1 through the first clutch $C_1$ 1-2, the input shaft 1-3 is connected to a variable displacement pump 2-3 through a hydraulic-power input gear pair 2-1, and the input shaft 1-3 is connected to a motor-power output shaft 3-5 through a second clutch $C_2$ 3-2. The input shaft 1-3 is connected to a first planetary gear planet carrier 4-4.

The hydraulic transmission assembly 2 mainly includes the variable displacement pump 2-3 and a quantitative motor 2-4. The motor transmission assembly 3 mainly includes a motor/generator 3-3, a controller 3-4, and a storage battery 3-1. The storage battery 3-1 is connected to the motor/generator 3-3 through the controller 3-4. The planetary gear assembly includes a first planetary gear mechanism 4, a second planetary gear mechanism 5, a third planetary gear mechanism 6, a fourth planetary gear mechanism 7, and a fifth planetary gear mechanism 8.

A first planetary gear sun gear 4-3 is selectively connected to the motor-power output shaft 3-5 through a fourth clutch $C_4$ 4-1, the first planetary gear planet carrier 4-4 is connected to the input shaft 1-3, and a first planetary gear ring gear 4-6 is fixedly connected to a second planetary gear ring gear 5-4. A second planetary gear sun gear 5-3 is connected to the quantitative motor 2-4 through a hydraulic-power output gear pair 2-5, and a second planetary gear planet carrier 5-2 is connected to a third planetary gear ring gear 6-6. The third planetary gear ring gear 6-6 is connected to a fourth planetary gear sun gear 7-1, a third planetary gear sun gear 6-3 can be connected to the third planetary gear ring gear 6-6 through a fifth clutch $C_5$ 6-1, and a third planetary gear planet carrier 6-4 is fixedly connected to a fourth planetary gear planet carrier 7-2. A fourth planetary gear ring gear 7-3 is fixedly connected to a fifth planetary gear ring gear 8-1. A fifth planetary gear planet carrier 8-2 is connected to the output shaft 9, and a fifth planetary gear sun gear 8-3 is connected to the motor-power output shaft 3-5 sequentially through a rear motor-power output gear pair 3-9, a sixth clutch $C_6$ 3-8, a middle motor-power transmission shaft 3-7, and a front motor-power output gear pair 3-6.

Continuously changing forward or reverse transmission modes are provided between the input member and the output member by adjusting the speed/torque of the engine 1-1 and the motor 3-3 and a displacement ratio of the hydraulic transmission assembly 2 and by selectively engaging the clutch assembly and the brake assembly. The engine power or/and motor power can be combined with hydraulic transmission, hydro-mechanical transmission, and mechanical transmission to obtain transmission outputs that meet the requirements of different working conditions, and the following power matching manners can be formed:

Specific examples are given below for illustration with reference to Table 1:

When the engine serves as a power source, engine-power hydraulic transmission, engine-power hydro-mechanical transmission, and engine-power mechanical transmission are provided.

The engine-power hydraulic transmission includes an engine-power hydraulic forward gear, a first engine-power hydraulic reverse gear, and a second engine-power hydraulic reverse gear.

Figure 2:
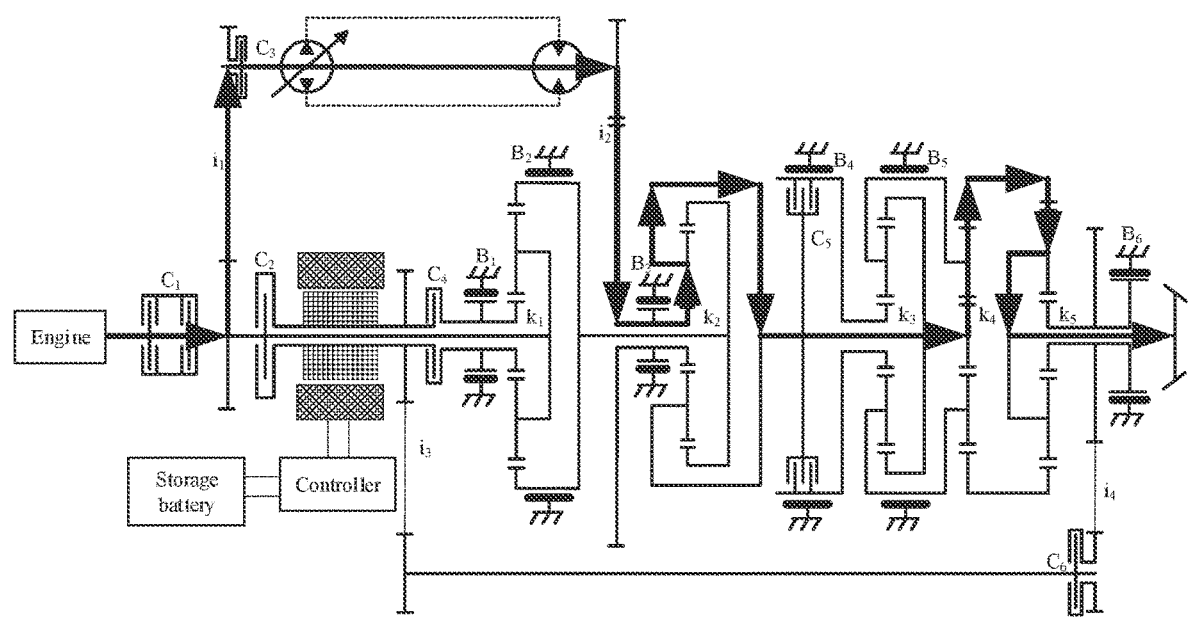
FIG. 2 is a schematic diagram showing the power flow in a hydraulic forward gear when power is supplied by an engine in the present invention.

The engine-power hydraulic forward gear is shown in FIG. 2, wherein only the first clutch $C_1$ 1-2, a third clutch $C_3$ 2-2, a second brake $B_2$ 4-5, a fifth brake $B_5$ 6-5, and a sixth brake $B_6$ 8-4 are engaged. The power of the engine 1-1 passes through the first clutch $C_1$ 1-2, the input shaft 1-3, the hydraulic transmission assembly 2, the second planetary gear sun gear 5-3, the second planetary gear planet carrier 5-2, the fourth planetary gear sun gear 7-1, the fourth planetary gear ring gear 7-3, the fifth planetary gear ring gear 8-1, and the fifth planetary gear planet carrier 8-2 and is output from the output shaft 9.

Figure 3:
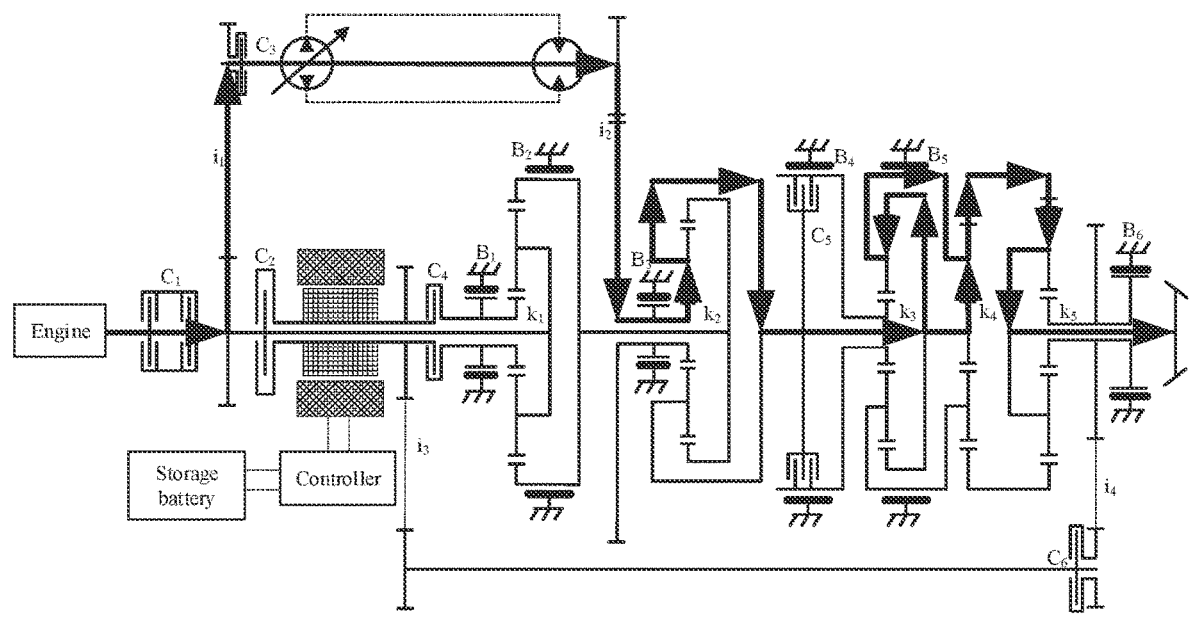
FIG. 3 is a schematic diagram showing the power flow in a first hydraulic reverse gear when power is supplied by the engine in the present invention.

The first engine-power hydraulic reverse gear is shown in FIG. 3, wherein only the first clutch $C_1$ 1-2, the third clutch $C_3$ 2-2, the second brake $B_2$ 4-5, a fourth brake $B_4$ 6-2, and the sixth brake $B_6$ 8-4 are engaged. The power of the engine 1-1 passes through the first clutch $C_1$ 1-2, the input shaft 1-3, the hydraulic transmission assembly 2, the second planetary gear sun gear 5-3, and the second planetary gear planet carrier 5-2. One part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. Then, the power passes through the fourth planetary gear ring gear 7-3, the fifth planetary gear ring gear 8-1, and the fifth planetary gear planet carrier 8-2 and is output from the output shaft 9.

Figure 4:
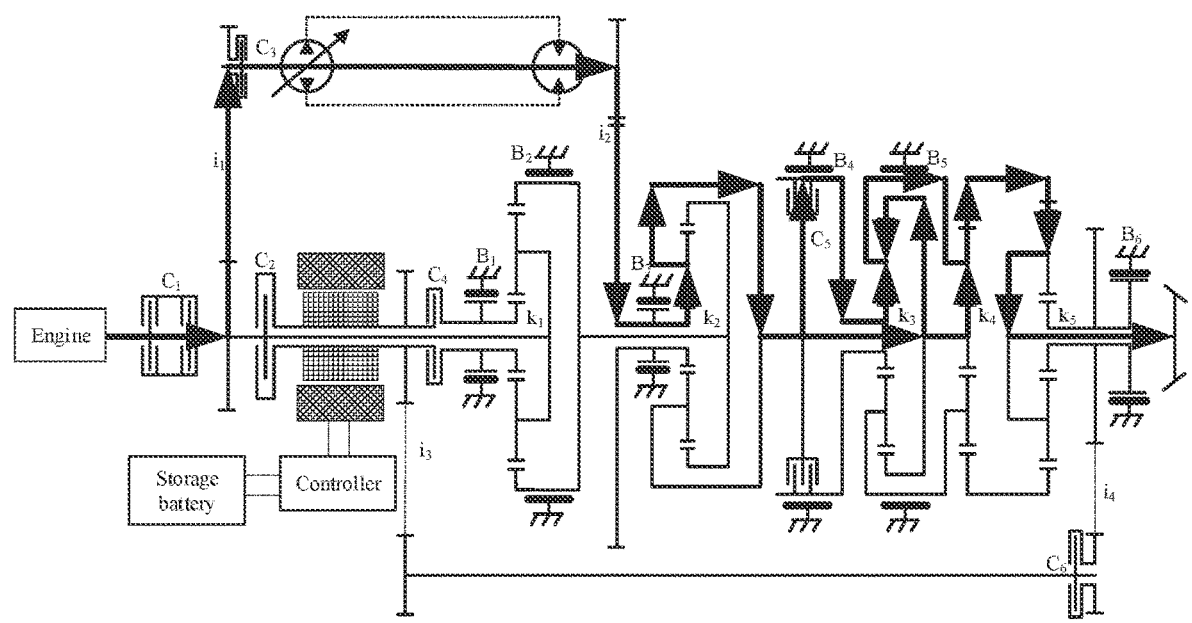
FIG. 4 is a schematic diagram showing the power flow in a second hydraulic reverse gear when power is supplied by the engine in the present invention.

The second engine-power hydraulic reverse gear is shown in FIG. 4, wherein only the first clutch $C_1$ 1-2, the third clutch $C_3$ 2-2, the fifth clutch $C_5$ 6-1, the second brake $B_2$ 4-5, and the sixth brake $B_6$ 8-4 are engaged. The power of the engine 1-1 passes through the first clutch $C_1$ 1-2, the input shaft 1-3, the hydraulic transmission assembly 2, the second planetary gear sun gear 5-3, the second planetary gear planet carrier 5-2, the third planetary gear mechanism 6, the fourth planetary gear mechanism 7, the fifth planetary gear ring gear 8-1, and the fifth planetary gear planet carrier 8-2 and is output from the output shaft 9.

The engine-power hydro-mechanical transmission includes a first engine-power hydro-mechanical forward gear, a second engine-power hydro-mechanical forward gear, and an engine-power hydro-mechanical reverse gear.

Figure 5:
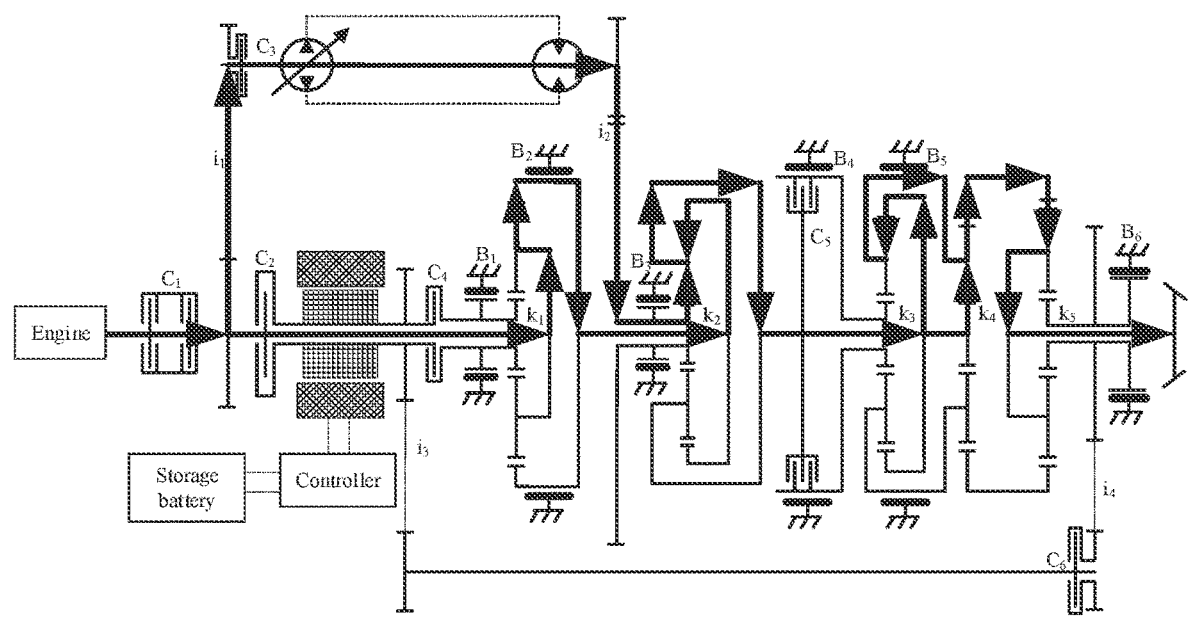
FIG. 5 is a schematic diagram showing the power flow in a first hydro-mechanical forward gear when power is supplied by the engine in the present invention.

The first engine-power hydro-mechanical forward gear is shown in FIG. 5, wherein only the first clutch $C_1$ 1-2, the third clutch $C_3$ 2-2, a first brake $B_1$ 4-2, the fourth brake $B_4$ 6-2, and the sixth brake $B_6$ 8-4 are engaged. The power of the engine 1-1 is transmitted through the first clutch $C_1$ 1-2 to the input shaft 1-3. One part of the power is transmitted through the hydraulic transmission assembly 2 and the second planetary gear sun gear 5-3 to the second planetary gear planet carrier 5-2, and is converged at the second planetary gear planet carrier 5-2 with the other part of the power that passes through the first planetary gear planet carrier 4-4, the first planetary gear ring gear 4-6, and the second planetary gear ring gear 5-4. One part of the power after convergence is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. Then, the power passes through the fourth planetary gear ring gear 7-3, the fifth planetary gear ring gear 8-1, and the fifth planetary gear planet carrier 8-2 and is output from the output shaft 9.

Figure 6:
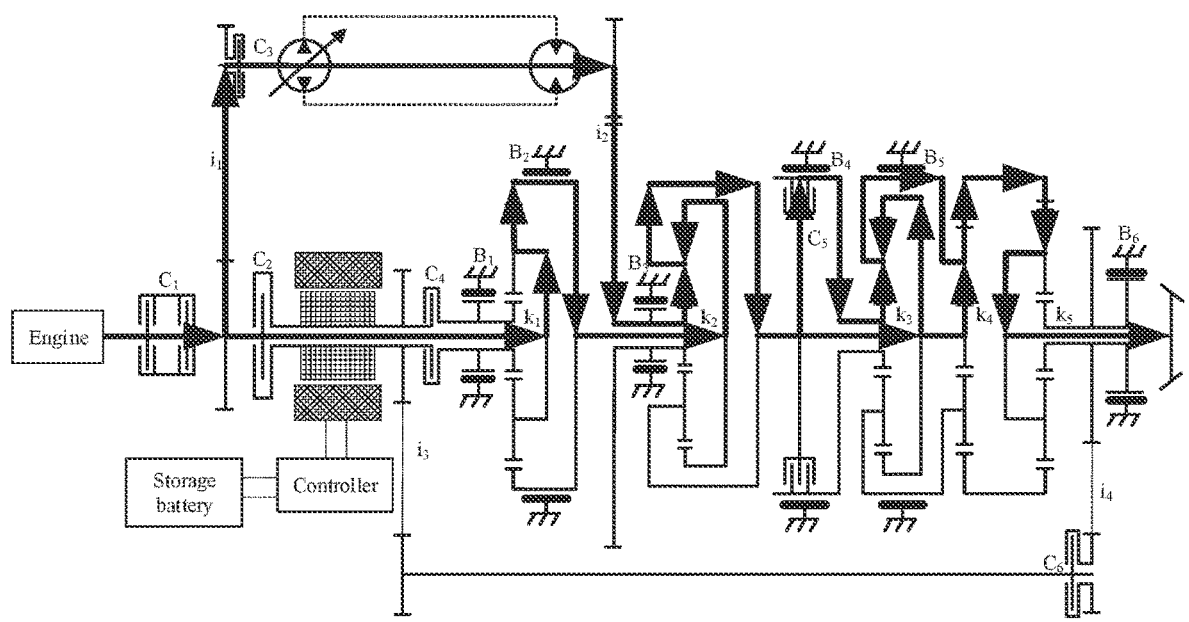
FIG. 6 is a schematic diagram showing the power flow in a second hydro-mechanical forward gear when power is supplied by the engine in the present invention.

The second engine-power hydro-mechanical forward gear is shown in FIG. 6, wherein only the first clutch $C_1$ 1-2, the third clutch $C_3$ 2-2, the fifth clutch $C_5$ 6-1, the first brake $B_1$ 4-2, and the sixth brake $B_6$ 8-4 are engaged. The power of the engine 1-1 is transmitted through the first clutch $C_1$ 1-2 to the input shaft 1-3. One part of the power is transmitted through the hydraulic transmission assembly 2 and the second planetary gear sun gear 5-3 to the second planetary gear planet carrier 5-2, and is converged at the second planetary gear planet carrier 5-2 with the other part of the power that passes through the first planetary gear planet carrier 4-4, the first planetary gear ring gear 4-6, and the second planetary gear ring gear 5-4, Then, the power passes through the third planetary gear mechanism 6, the fourth planetary gear mechanism 7, the fifth planetary gear ring gear 8-1, and the fifth planetary gear planet carrier 8-2 and is output from the output shaft 9.

Figure 7:
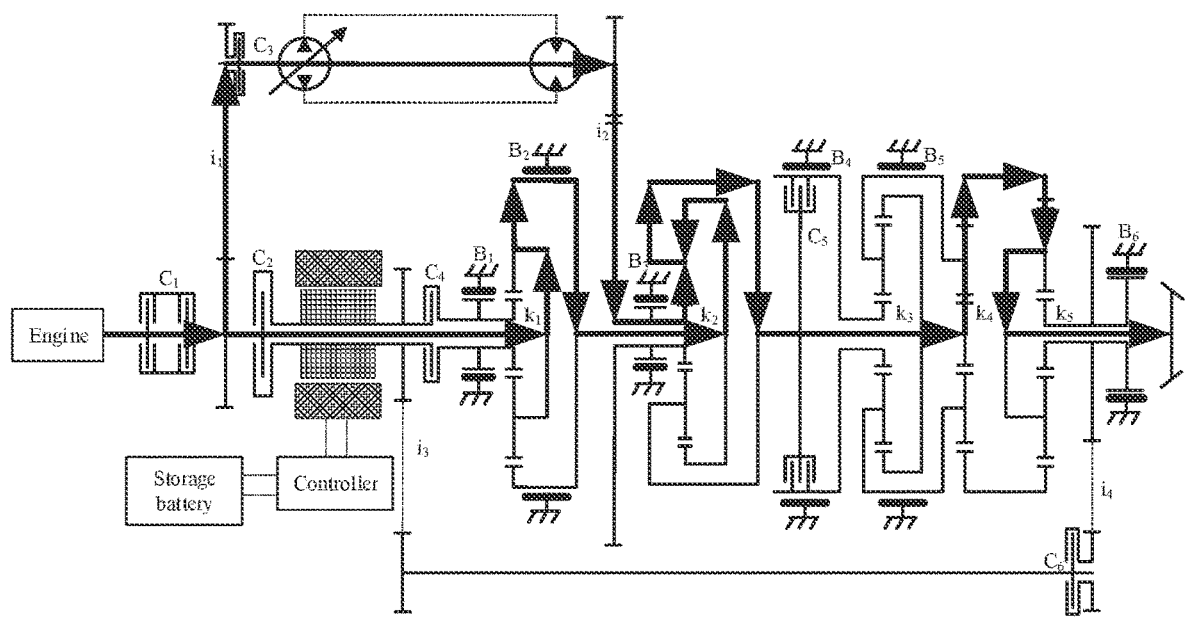
FIG. 7 is a schematic diagram showing the power flow in a hydro-mechanical reverse gear when power is supplied by the engine in the present invention.

The engine-power hydro-mechanical reverse gear is shown in FIG. 7, wherein only the first clutch $C_1$ 1-2, the third clutch $C_3$ 2-2, the first brake $B_1$ 4-2, the fifth brake $B_5$ 6-5, and the sixth brake $B_6$ 8-4 are engaged. The power of the engine 1-1 is transmitted through the first clutch C 1-2 to the input shaft 1-3. One part of the power is transmitted through the hydraulic transmission assembly 2 and the second planetary gear sun gear 5-3 to the second planetary gear planet carrier 5-2, and is converged at the second planetary gear planet carrier 5-2 with the other part of the power that passes through the first planetary gear planet carrier 4-4, the first planetary gear ring gear 4-6, and the second planetary gear ring gear 5-4. Then, the power after convergence passes through the fourth planetary gear sun gear 7-1, the fourth planetary gear ring gear 7-3, the fifth planetary gear ring gear 8-1, and the fifth planetary gear planet carrier 8-2 and is Output from the output shaft 9.

The engine-power mechanical transmission includes a first engine-power mechanical forward gear, a second engine-power mechanical forward gear, and an engine-power mechanical reverse gear.

Figure 8:
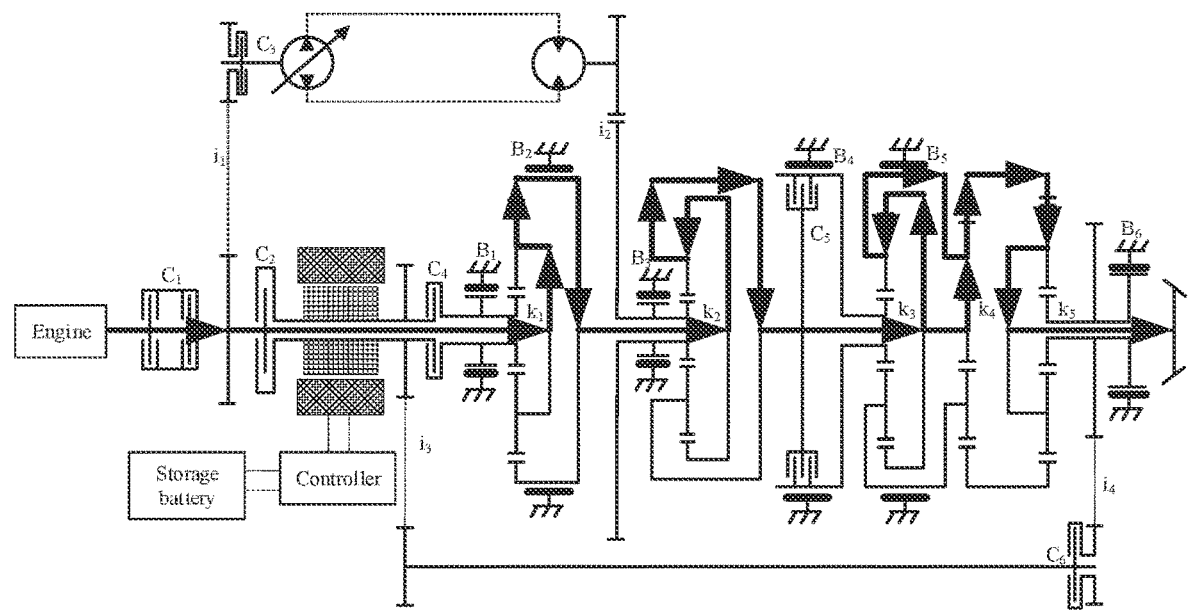
FIG. 8 is a schematic diagram showing the power flow in a first mechanical forward gear when power is supplied by the engine in the present invention.

The first engine-power mechanical forward gear is shown in FIG. 8, wherein only the first clutch $C_1$ 1-2, the first brake $B_1$ 4-2, a third brake $B_3$ 5-1, the fourth brake $B_4$ 6-2, and the sixth brake $B_6$ 8-4 are engaged. The power of the engine 1-1 is transmitted through the first clutch $C_1$ 1-2, the input shaft 1-3, the first planetary gear planet carrier 4-4, the first planetary gear ring gear 4-6, and the second planetary gear ring gear 5-4 to the second planetary gear planet carrier 5-2. One part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. Then, the power passes through the fourth planetary gear ring gear 7-3, the fifth planetary gear ring gear 8-1, and the fifth planetary gear planet carrier 8-2 and is output from the output shaft 9.

Figure 9:
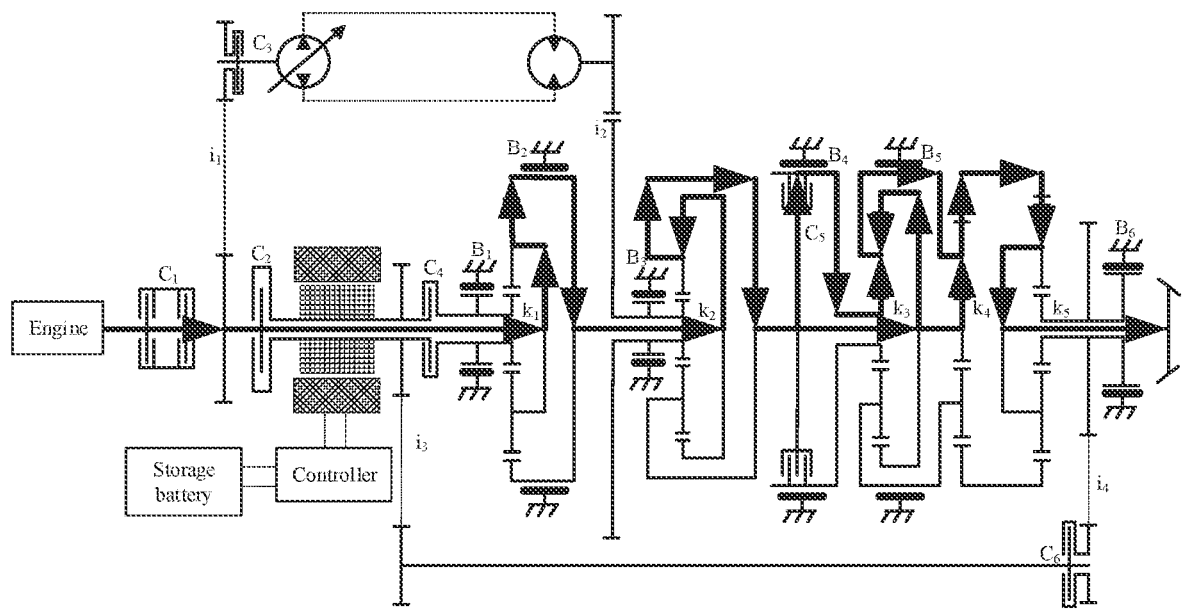
FIG. 9 is a schematic diagram showing the power flow in a second mechanical forward gear when power is supplied by the engine in the present invention.

The second engine-power mechanical forward gear is shown in FIG. 9, wherein only the first clutch $C_1$ 1-2, the fifth clutch $C_5$ 6-1, the first brake $B_1$ 4-2, the third brake $B_3$ 5-1, and the sixth brake $B_6$ 8-4 are engaged. The power of the engine 1-1 is transmitted through the first clutch $C_1$ 1-2, the input shaft 1-3, the first planetary gear planet carrier 4-4, the first planetary gear ring gear 4-6, and the second planetary gear ring gear 5-4 to the second planetary gear planet carrier 5-2, Then, the power passes through the third planetary gear mechanism 6, the fourth planetary gear mechanism 7, the fifth planetary gear ring gear 8-1, and the fifth planetary gear planet carrier 8-2 and is output from the output shaft 9.

Figure 10:
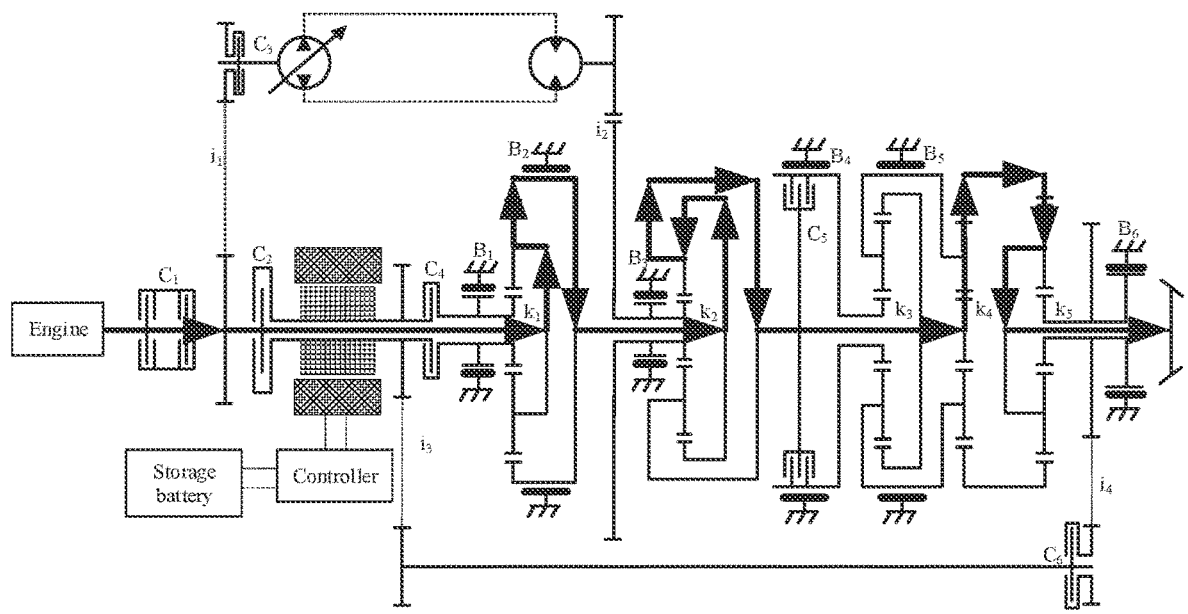
FIG. 10 is a schematic diagram showing the power flow in a mechanical reverse gear when power is supplied by the engine in the present invention.

The engine-power mechanical reverse gear is shown in FIG. 10, wherein only the first clutch $C_1$ 1-2, the first brake $B_1$ 4-2, the third brake $B_3$ 5-1, the fifth brake $B_5$ 6-5, and the sixth brake $B_6$ 8-4 are engaged. The power of the engine 1-1 passes through the first clutch $C_1$ 1-2, the input shaft 1-3, the first planetary gear planet carrier 4-4, the first planetary gear ring gear 4-6, the second planetary gear ring gear 5-4, the second planetary gear planet carrier 5-2, the fourth planetary gear sun gear 7-1, the fourth planetary gear ring gear 7-3, the fifth planetary gear ring gear 8-1, and the fifth planetary gear planet carrier 8-2 and is output from the output shaft 9.

The motor serves as a power source.

Figure 11:
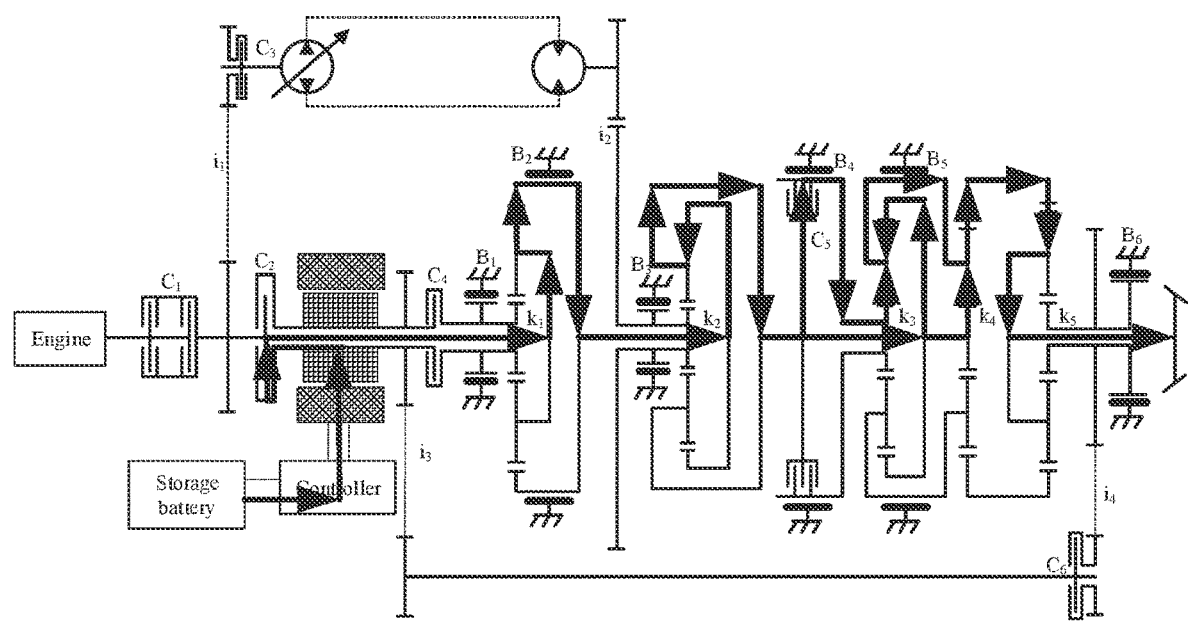
FIG. 11 is a schematic diagram showing the power flow in a mechanical forward/reverse gear when power is supplied by a motor in the present invention.

A motor-power mechanical forward/reverse gear is shown in FIG. 11, wherein the second clutch $C_2$ 3-2, the fifth clutch $C_5$ 6-1, the first brake $B_1$ 4-2, the third brake $B_3$ 5-1, and the sixth brake $B_6$ 8-4 are engaged, Power is transmitted through the storage battery 3-1, the controller 3-4, the motor 3-3, the motor-power Output shaft 3-5, the second clutch $C_2$ 3-2, the input shaft 1-3, the first planetary gear planet carrier 4-4, the first planetary gear ring gear 4-6, and the second planetary gear ring gear 5-4 to the second planetary gear planet carrier 5-2. Then, the power passes through the third planetary gear mechanism 6, the fourth planetary gear mechanism 7, the fifth planetary gear ring gear 8-1, and the fifth planetary gear planet carrier 8-2 and is output from the output shaft 9.

When the engine and the motor serve as power sources, the hybrid power coupling manner is torque coupling which specifically includes: engine-motor hybrid power torque-coupling hydro-mechanical transmission and engine-motor hybrid power torque-coupling mechanical transmission. The power flows of a first engine-motor hybrid power torque-coupling hydro-mechanical forward gear and a first engine-motor hybrid power torque-coupling mechanical forward gear are taken as examples for illustration below.

Figure 12:
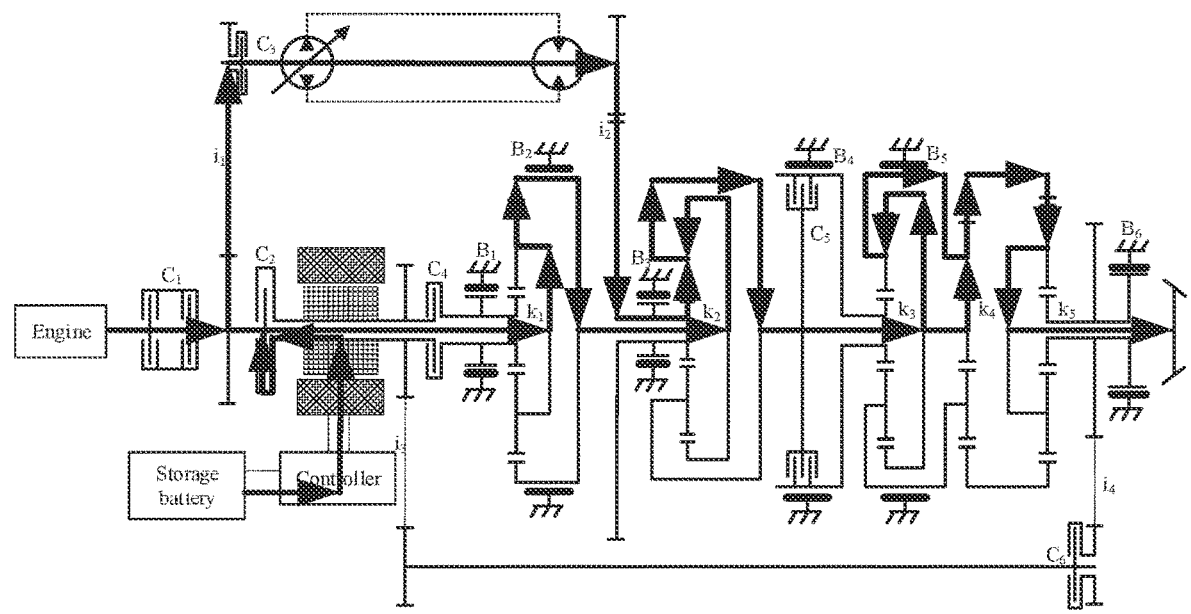
FIG. 12 is a schematic diagram showing the power flow in a first torque-coupling hydro-mechanical forward gear when hybrid power is supplied by the engine and the motor in the present invention.

The first engine-motor hybrid power torque-coupling hydro-mechanical forward gear is shown in FIG. 12, wherein the first clutch $C_1$ 1-2, the second clutch $C_2$ 3-2, the third clutch $C_3$ 2-2, the first brake $B_1$ 4-2, the fourth brake $B_4$ 6-2, and the sixth brake $B_6$ 8-4 are engaged. The power of the engine 1-1 is transmitted through the first clutch $C_1$ 1-2 to the input shaft 1-3, the electric power is transmitted through the storage battery 3-1, the controller 3-4, the motor 3-3, the motor-power output shaft 3-5, and the second clutch $C_2$ 3-2 to the input shaft 1-3, and the hybrid power is coupled on the input shaft 1-3. One part of the hybrid power is transmitted through the hydraulic transmission assembly 2 and the second planetary gear sun gear 5-3 to the second planetary gear planet carrier 5-2, and is converged at the second planetary gear planet carrier 5-2 with the other part of the hybrid power that passes through the first planetary gear planet carrier 4-4, the first planetary gear ring gear 4-6, and the second planetary gear ring gear 5-4. Then, the hybrid power is split again, wherein one part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. Finally, the power passes through the fourth planetary gear ring gear 7-3, the fifth planetary gear ring gear 8-1, and the fifth planetary gear planet carrier 8-2 and is output from the output shaft 9.

Figure 13:
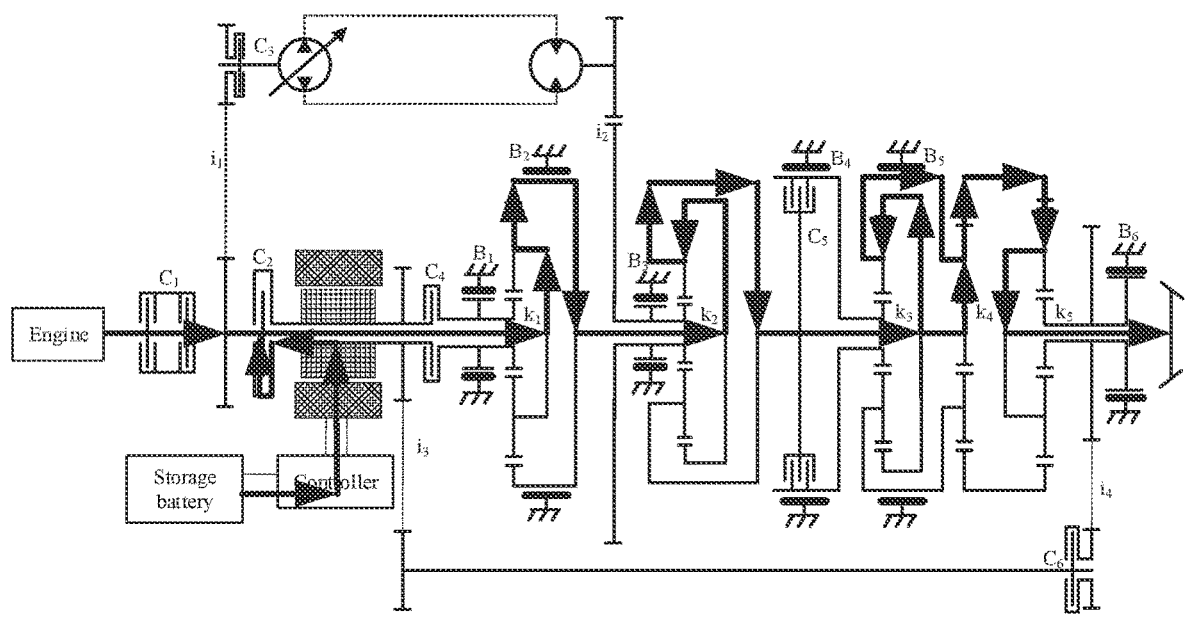
FIG. 13 is a schematic diagram showing the power flow in a first torque-coupling mechanical forward gear when hybrid power is supplied by the engine and the motor in the present invention.

The first engine-motor hybrid power torque-coupling mechanical forward gear is shown in FIG. 13, wherein the first clutch $C_1$ 1-2, the second clutch $C_2$ 3-2, the first brake $B_1$ 4-2, the third brake $B_3$ 5-1, the fourth brake $B_4$ 6-2, and the sixth brake $B_6$ 8-4 are engaged. The power of the engine is transmitted through the first clutch $C_1$ 1-2 to the input shaft 1-3, the electric power is transmitted through the storage battery 3-1, the controller 3-4, the motor 3-3, the motor-power output shaft 3-5, and the second clutch 3-2 to the input shaft 1-3, and the hybrid power is coupled on the input shaft 1-3 and is transmitted through the first planetary gear planet carrier 4-4, the first planetary gear ring gear 4-6, and the second planetary gear ring gear 5-4 to the second planetary gear planet carrier 5-2. Then, the hybrid power is split, wherein one part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. Finally, the power passes through the fourth planetary gear ring gear 7-3, the fifth planetary gear ring gear 8-1, and the fifth planetary gear planet carrier 8-2 and is output from the output shaft 9.

When the engine and the motor serve as power sources, the hybrid power coupling manner is low-speed coupling which specifically includes: engine-motor hybrid power low-speed-coupling hydro-mechanical transmission and engine-motor hybrid power low-speed-coupling mechanical transmission. The power flows of a first engine-motor hybrid power low-speed-coupling hydro-mechanical forward gear and a first engine-motor hybrid power low-speed-coupling mechanical forward gear are taken as examples for illustration below.

Figure 14:
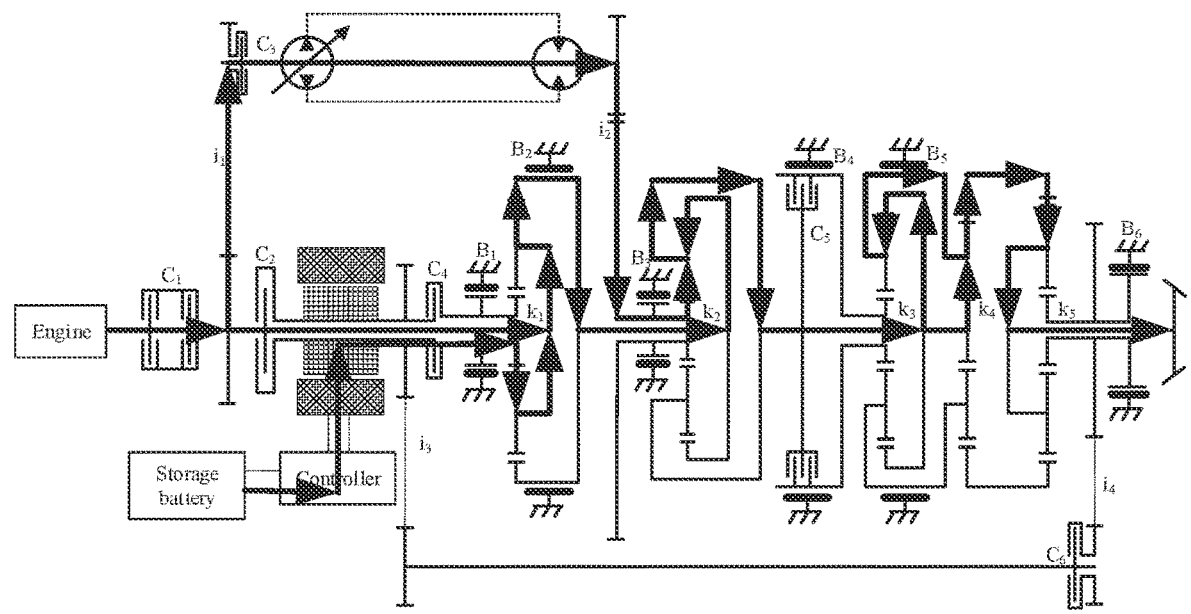
FIG. 14 is a schematic diagram showing the power flow in a first low-speed-coupling hydro-mechanical forward gear when hybrid power is supplied by the engine and the motor in the present invention.

The first engine-motor hybrid power low-speed-coupling hydro-mechanical forward gear is shown in FIG. 14, wherein the first clutch $C_1$ 1-2, the third clutch $C_3$ 2-2, the fourth clutch $C_4$ 4-1, the fourth brake $B_4$ 6-2, and the sixth brake $B_5$ 8-4 are engaged. The power of the engine 1-1 is transmitted through the first clutch $C_1$ 1-2 to the input shaft 1-3. One part of the power is transmitted through the hydraulic transmission assembly 2 and the second planetary gear sun gear 5-3 to the second planetary gear planet carrier 5-2. The other part of the power passes through the input shaft 1-3, and is converged at the first planetary gear ring gear 4-6 with the electric power from the storage battery 3-1, the controller 3-4, the motor 3-3, the motor-power output shaft 3-5, the fourth clutch $C_4$ 4-1, and the first planetary gear sun gear 4-3. Then, the power passes through the second planetary gear ring gear 5-4 and is converged at the second planetary gear planet carrier 5-2 with the power from the second planetary gear sun gear 5-3. After that, the hybrid power is split again, wherein one part of the power is transmitted through the third planetary gear ring gear 6-6 and the third planetary gear planet carrier 6-4 to the fourth planetary gear planet carrier 7-2, and is converged at the fourth planetary gear ring gear 7-3 with the other part of the power that passes through the fourth planetary gear sun gear 7-1. Finally, the power passes through the fifth planetary gear ring gear 8-1 and the fifth planetary gear planet carrier 8-2 and is output from the output shaft 9.

Figure 15:
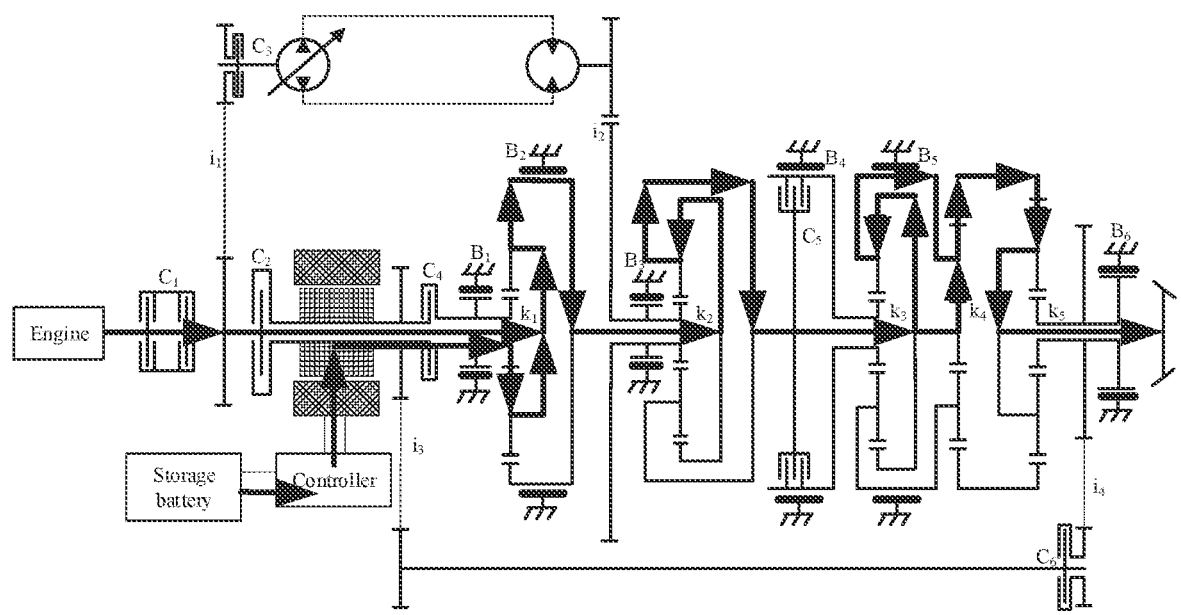
FIG. 15 is a schematic diagram showing the power flow in a first low-speed-coupling mechanical forward gear when hybrid power is supplied by the engine and the motor in the present invention.

The first engine-motor hybrid power low-speed-coupling mechanical forward gear is shown in FIG. 15, wherein the first clutch $C_1$ 1-2, the fourth clutch $C_4$ 4-1, the third brake $B_3$ 5-1, the fourth brake $B_4$ 6-2, and the sixth brake $B_6$ 8-4 are engaged. The power of the engine 1-1 passes through the first clutch $C_1$ 1-2 and the input shaft 1-3, and is converged at the first planetary gear ring gear 4-6 with the electric power from the storage battery 3-1, the controller 3-4, the motor 3-3, the motor-power output shaft 3-5, the fourth clutch $C_4$ 4-1, and the first planetary gear sun gear 4-3. Then, the power is transmitted through the second planetary gear ring gear 5-4 to the second planetary gear planet carrier 5-2. After that, the hybrid power is split again, wherein one part of the power is transmitted through the third planetary gear ring gear 6-6 and the third planetary gear planet carrier 6-4 to the fourth planetary gear planet carrier 7-2, and is converged at the fourth planetary gear g gear 7-3 with the other part of the power that passes through the fourth planetary gear sun gear 7-1. Finally, the power passes through the fifth planetary gear ring gear 8-1 and the fifth planetary gear planet carrier 8-2 and is output from the output shaft 9.

When the engine and the motor serve as power sources, the hybrid power coupling manner is high-speed coupling which specifically includes: engine-motor hybrid power high-speed-coupling hydro-mechanical transmission and engine-motor hybrid power high-speed-coupling mechanical transmission. The power flows of a first engine-motor hybrid power high-speed-coupling hydro-mechanical forward gear and a first engine-motor hybrid power high-speed-coupling mechanical forward gear are taken as examples for illustration below.

Figure 16:
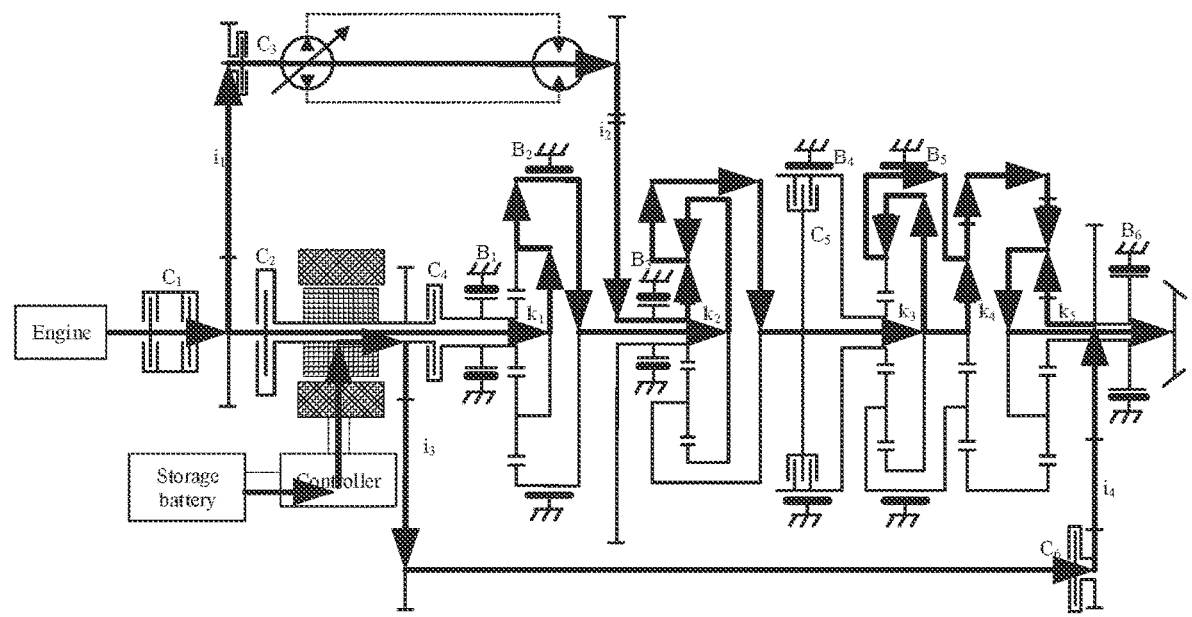
FIG. 16 is a schematic diagram showing the power flow in a first high-speed-coupling hydro-mechanical forward gear when hybrid power is supplied by the engine and the motor in the present invention.

The first engine-motor hybrid power high-speed-coupling hydro-mechanical forward gear is shown in FIG. 16, wherein the first clutch $C_1$ 1-2, the third clutch $C_3$ 2-2, the sixth clutch $C_6$ 3-8, the first brake $B_1$ 4-2, and the fourth brake $B_4$ 6-2 are engaged. The power of the engine 1-1 is transmitted through the first clutch $C_1$ 1-2 to the input shaft 1-3. One part of the power is transmitted through the hydraulic transmission assembly 2 and the second planetary gear sun gear 5-3 to the second planetary gear planet carrier 5-2, and is converged at the second planetary gear planet carrier 5-2 with the other part of the power that passes through the first planetary gear planet carrier 4-1, the first planetary gear ring gear 4-6, and the second planetary gear ring gear 5-4. Then, the engine power is split again, wherein one part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. The engine power passes through the fourth planetary gear ring gear 7-3 and the fifth planetary gear ring gear 8-1, and is converged at the fifth planetary gear planet carrier 8-2 with the electric power from the storage battery 3-1, the controller 3-4, the motor 3-3, the motor-power output shaft 3-5, the front motor-power output gear pair 3-6, the middle motor-power transmission shaft 3-7, the sixth clutch $C_6$ 3-8, and the rear motor-power output gear pair 3-9. Finally, the power is output from the output shaft 9.

Figure 17:
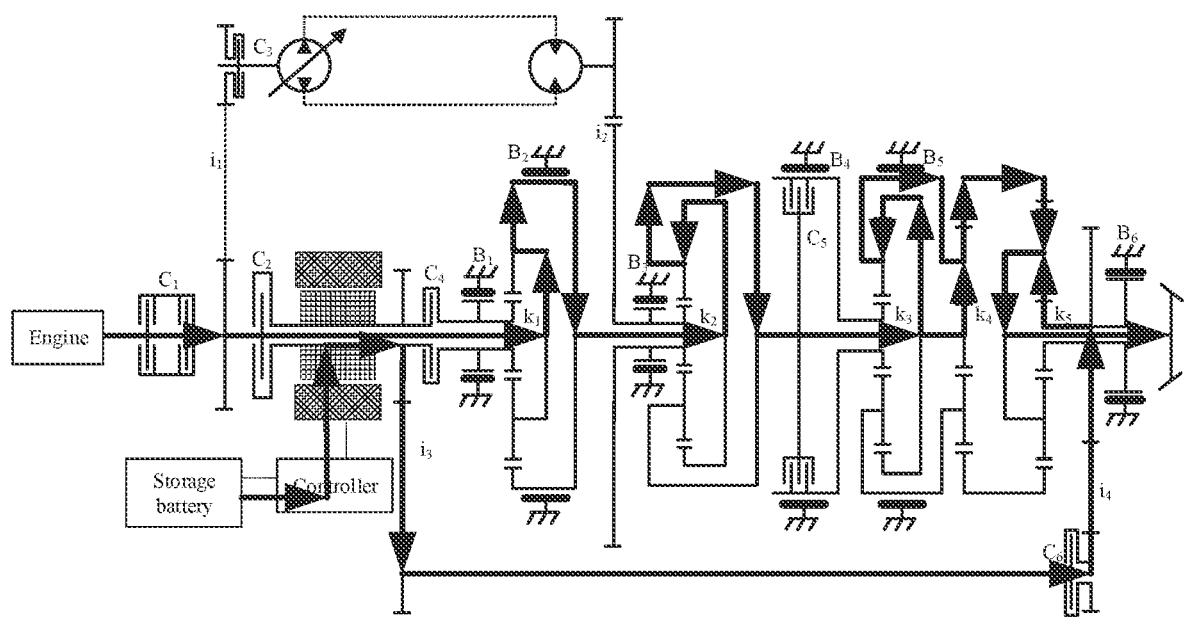
FIG. 17 is a schematic diagram showing the power flow in a first high-speed-coupling mechanical forward gear when hybrid power is supplied by the engine and the motor in the present invention.

The first engine-motor hybrid power high-speed-coupling mechanical forward gear is shown in FIG. 17, wherein the first clutch $C_1$ 1-2, the sixth clutch $C_6$ 3-8, the first brake $B_1$ 4-2, the third brake $B_3$ 5-1, and the fourth brake $B_4$ 6-2 are engaged. The power of the engine 1-1 is transmitted through the first clutch $C_1$ 1-2, the input shaft 1-3, the first planetary gear planet carrier 4-4, the first planetary gear ring gear 4-6, and the second planetary gear ring gear 5-4 to the second planetary gear planet carrier 5-2. One part of the power is transmitted through the third planetary gear ring gear 6-6 and the third planetary gear planet carrier 6-4 to the fourth planetary gear planet carrier 7-2, and is converged at the fourth planetary gear planet carrier 7-2 with the other part of the power that passes through the fourth planetary gear sun gear 7-1. The engine power passes through the fourth planetary gear ring gear 7-3 and the fifth planetary gear ring gear 8-1, and is converged at the fifth planetary gear planet carrier 8-2 with the electric power from the storage battery 3-1, the controller 3-4, the motor 3-3, the motor-power output shaft 3-5, the front motor-power output gear pair 3-6, the middle motor-power transmission shaft 3-7, the sixth clutch $C_6$ 3-8, and the rear motor-power output gear pair 3-9. Finally, the power is output from the output shaft 9.

TABLE 1

| | | | | Engagement/disengagement of each component | | | | | | | | | | | |
|---|---|---|---|---|---|---|---|---|---|---|---|---|---|---|---|
| Power source | Power coupling manner | Transmission mode | Gear | Clutch state | | | | | | Brake state | | | | | |
| | | | | $C_1$ | $C_2$ | $C_3$ | $C_4$ | $C_5$ | $C_6$ | $B_1$ | $B_2$ | $B_3$ | $B_4$ | $B_5$ | $B_6$ |
| Engine | None | Hydraulic | Forward gear | ▲ | △ | ▲ | △ | △ | △ | △ | ▲ | △ | △ | ▲ | ▲ |
| | | | First reverse gear | ▲ | △ | ▲ | △ | △ | △ | △ | ▲ | △ | ▲ | △ | ▲ |
| | | | Second reverse gear | ▲ | △ | ▲ | △ | ▲ | △ | △ | ▲ | △ | △ | △ | ▲ |
| | | Hydro-mechanical | First forward gear | ▲ | △ | ▲ | △ | △ | △ | ▲ | △ | △ | ▲ | △ | ▲ |
| | | | Second forward gear | ▲ | △ | ▲ | △ | ▲ | △ | ▲ | △ | △ | △ | △ | ▲ |
| | | | Reverse gear | ▲ | △ | ▲ | △ | △ | △ | ▲ | △ | △ | △ | ▲ | ▲ |
| | | Mechanical | First forward gear | ▲ | △ | △ | △ | △ | △ | ▲ | △ | ▲ | ▲ | △ | ▲ |
| | | | Second forward gear | ▲ | △ | △ | △ | ▲ | △ | ▲ | △ | ▲ | △ | △ | ▲ |
| | | | Reverse gear | ▲ | △ | △ | △ | △ | △ | ▲ | △ | ▲ | △ | ▲ | ▲ |
| Motor | None | Mechanical | Forward/reverse gear | △ | ▲ | △ | △ | ▲ | △ | ▲ | △ | ▲ | △ | △ | ▲ |
| Engine-motor | Torque coupling | Hydro-mechanical | First forward gear | ▲ | ▲ | ▲ | △ | △ | △ | ▲ | △ | △ | ▲ | △ | ▲ |
| | | | Second forward gear | ▲ | ▲ | ▲ | △ | ▲ | △ | ▲ | △ | △ | △ | △ | ▲ |
| | | | Reverse gear | ▲ | ▲ | ▲ | △ | △ | △ | ▲ | △ | △ | △ | ▲ | ▲ |
| | | Mechanical | First forward gear | ▲ | ▲ | △ | △ | △ | △ | ▲ | △ | ▲ | ▲ | △ | ▲ |
| | | | Second forward gear | ▲ | ▲ | △ | △ | ▲ | △ | ▲ | △ | ▲ | △ | △ | ▲ |
| | | | Reverse gear | ▲ | ▲ | △ | △ | △ | △ | ▲ | △ | ▲ | △ | ▲ | ▲ |

TABLE 1-continued

| | | | | Engagement/disengagement of each component | | | | | | | | | | | |
|---|---|---|---|---|---|---|---|---|---|---|---|---|---|---|---|
| | | | | Clutch state | | | | | | Brake state | | | | | |
| Power source | Power coupling manner | Transmission mode | Gear | $C_1$ | $C_2$ | $C_3$ | $C_4$ | $C_5$ | $C_6$ | $B_1$ | $B_2$ | $B_3$ | $B_4$ | $B_5$ | $B_6$ |
| | Low-speed coupling | Hydro-mechanical | First forward gear | ▲ | Δ | ▲ | ▲ | Δ | Δ | Δ | Δ | Δ | ▲ | Δ | ▲ |
| | | | Second forward gear | ▲ | Δ | ▲ | ▲ | ▲ | Δ | Δ | Δ | Δ | Δ | Δ | ▲ |
| | | | Reverse gear | ▲ | Δ | ▲ | ▲ | Δ | Δ | Δ | Δ | Δ | Δ | ▲ | ▲ |
| | | Mechanical | First forward gear | ▲ | Δ | Δ | ▲ | Δ | Δ | Δ | Δ | ▲ | ▲ | Δ | ▲ |
| | | | Second forward gear | ▲ | Δ | Δ | ▲ | ▲ | Δ | Δ | Δ | ▲ | Δ | Δ | ▲ |
| | | | Reverse gear | ▲ | Δ | Δ | ▲ | Δ | Δ | Δ | Δ | ▲ | Δ | ▲ | ▲ |
| | High-speed coupling | Hydro-mechanical | First forward gear | ▲ | Δ | ▲ | Δ | Δ | ▲ | ▲ | Δ | Δ | ▲ | Δ | Δ |
| | | | Second forward gear | ▲ | Δ | ▲ | Δ | ▲ | ▲ | ▲ | Δ | Δ | Δ | Δ | Δ |
| | | | Reverse gear | ▲ | Δ | ▲ | Δ | Δ | ▲ | ▲ | Δ | Δ | Δ | ▲ | Δ |
| | | Mechanical | First forward gear | ▲ | Δ | Δ | Δ | Δ | ▲ | ▲ | Δ | ▲ | ▲ | Δ | Δ |
| | | | Second forward gear | ▲ | Δ | Δ | Δ | ▲ | ▲ | ▲ | Δ | ▲ | Δ | Δ | Δ |
| | | | Reverse gear | ▲ | Δ | Δ | Δ | Δ | ▲ | ▲ | Δ | ▲ | Δ | ▲ | Δ |

In Table 1: 1. B stands for brake, and C stands for clutch;
2. ▲ stands for engagement of a gear-shift component, and Δ stands for disengagement of a gear-shift component.

The following modes are illustrated in terms of transmission relationships:

engine-power hydraulic transmission, engine-power hydro-mechanical transmission, and engine-power mechanical transmission.

The engine-power hydraulic transmission includes an engine-power hydraulic forward gear, a first engine-power hydraulic reverse gear, and a second engine-power hydraulic reverse gear.

In the engine-power hydraulic forward gear, the rotation speeds of the input shaft and the output shaft are in the following relationship:

$$n_o = -\frac{\frac{e}{i_1 i_2} k_5}{k_4(1+k_2)(1+k_5)} n_e \qquad (1)$$

wherein $n_o$ is the rotation speed of the output shaft, $n_e$ is the rotation speed of the engine, $i_1$ is a transmission ratio of the hydraulic-power input gear pair, $i_2$ is a transmission ratio of the hydraulic-power output gear pair, e is a displacement ratio of the hydraulic transmission assembly, and $k_j$ is $j^{th}$ planetary gear characteristic parameter (j=1, 2, 3, 4, 5).

In the first engine-power hydraulic reverse gear, the rotation speeds of the input shaft and the output shaft are in the following relationship:

$$n_o = \frac{(k_3 k_1 - 1)\frac{e}{i_1 i_2} k_5}{k_4(1+k_2)(1+k_3)(1+k_5)} n_e \qquad (2)$$

In the second engine-power hydraulic reverse gear, the rotation speeds of the input shaft and the output shaft are in the following relationship:

$$n_o = \frac{\frac{e}{i_1 i_2} k_5}{(1+k_2)(1+k_5)} n_e \qquad (3)$$

The engine-power hydro-mechanical transmission includes a first engine-power hydro-mechanical forward gear, a second engine-power hydro-mechanical forward gear, and an engine-power hydro-mechanical reverse gear.

In the first engine-power hydro-mechanical forward gear, the rotation speeds of the input shaft and the output shaft are in the following relationship:

$$n_o = \frac{\left(k_2 \frac{1+k_1}{k_1} + \frac{e}{i_1 i_2}\right)(k_3 k_4 - 1) k_5}{k_4(1+k_2)(1+k_3)(1+k_5)} n_e \qquad (4)$$

In the second engine-power hydro-mechanical forward gear, the rotation speeds of the input shaft and the output shaft are in the following relationship:

$$n_o = \frac{\left(k_2\frac{1+k_1}{k_1} + \frac{e}{i_1 i_2}\right)k_5}{(1+k_2)(1+k_5)} n_e \quad (5)$$

In the engine-power hydro-mechanical reverse gear, the rotation speeds of the input shaft and the output shaft are in the following relationship:

$$n_o = -\frac{\left(k_2\frac{1+k_1}{k_1} + \frac{e}{i_1 i_2}\right)k_5}{k_4(1+k_2)(1+k_5)} n_e \quad (6)$$

The engine-power mechanical transmission includes a first engine-power mechanical forward gear, a second engine-power mechanical forward gear, and an engine-power mechanical reverse gear.

In the first engine-power mechanical forward gear, the rotation speeds of the input shaft and the output shaft are in the following relationship:

$$n_o = \frac{(k_3 k_4 - 1)k_2(1+k_1)k_5}{k_1 k_4(1+k_2)(1+k_3)(1+k_5)} n_e \quad (7)$$

In the second engine-power mechanical forward gear, the rotation speeds of the input shaft and the output shaft are in the following relationship:

$$n_o = \frac{k_2(1+k_1)k_5}{(1+k_2)k_1(1+k_5)} n_e \quad (8)$$

In the engine-power mechanical reverse gear, the rotation speeds of the input shaft and the output shaft are in the following relationship:

$$n_o = \frac{k_2(1+k_1)k_5}{k_4(1+k_2)k_1(1+k_5)} n_e \quad (9)$$

Figure 18:
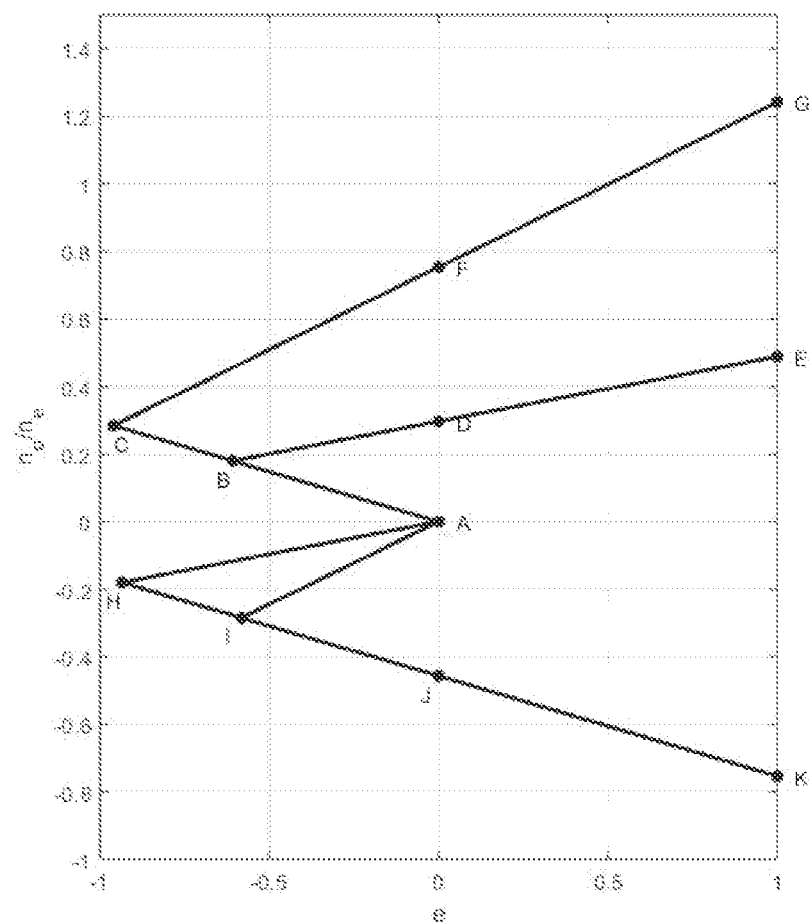
FIG. 18 is a diagram showing transmission paths of the engine power in the present invention.

If $k_1=1.8$, $k_2=1.6$, $k_3=k_4=1.65$, $k_5=3.71$, $i_1=0.62$, and $i_2=1$, the engine-power hydraulic transmission has the following relationships:

As shown in FIG. 18, in the engine-power hydraulic forward gear, the parameters are substituted into the formula (1) to obtain $n_o=(-0.30e)n_e$;

when $e\in[-1, 0]$, the corresponding range is $n_o\in[0, 0.30]n_e$, the formula (1) and the formula (5) can be simultaneously concerned to obtain an intersection point C (−0.95, 0.29); the range of the engine-power hydraulic forward gear can be obtained according to the intersection point, and it is denoted by the segment AC in the figure, wherein $e\in[-0.95,0], n_o\in[0,0.29]n_e$.

As shown in FIG. 18, in the first engine-power hydraulic reverse gear, the parameters are substituted into the formula (2) to obtain $n_o=(0.19e)n_e$;

when $e\in[-1, 0]$, the corresponding range is $n_o\in[-0.19, 0]n_e$, the formula (2) and the formula (6) can be simultaneously concerned to obtain an intersection point H (−0.94, −0.18);

the range of the first engine-power hydraulic reverse gear can be obtained according to the intersection point, and it is denoted by the segment AH in the figure, wherein $e\in[-0.94,0], n_o\in[0,-0.18]n_e$.

As shown in FIG. 18, in the second engine-power hydraulic reverse gear, the parameters are substituted into the formula (3) to obtain $n_o=(0.49e)n_e$;

when $e\in[-1, 0]$, the corresponding range is $n_o\in[-0.49, 0]n_e$, the formula (3) and the formula (6) can be simultaneously concerned to obtain an intersection point I (−0.58, −0.28);

the range of the second engine-power hydraulic reverse gear can be obtained according to the intersection point, and it is denoted by the segment AI in the figure, wherein $e\in[-0.58,0], n_o\in[-0.28,0]n_e$.

The engine-power hydro-mechanical transmission has the following relationships:

As shown in FIG. 18, in the first engine-power hydro-mechanical forward gear, the parameters are substituted into the formula (4) to obtain $n_o=(0.19e+0.30)n_e$;

when $e\in[-1, 1]$, the corresponding range is $n_o\in[0.11, 0.49]n_e$, the formula (1) and the formula (4) can be simultaneously concerned to obtain an intersection point B (−0.61, 0.18);

the range of the first engine-power hydro-mechanical forward gear can be obtained according to the intersection point, and it is denoted by the segment BE in the figure, wherein $e\in[-0.61,1], n\in[0.18,0.49]n_e$, When the displacement ratio of the hydraulic transmission assembly is $e=0$, the first engine-power mechanical forward gear is obtained:

the parameters are substituted into the formula (7) to obtain $n_o=0.30n$ which is denoted by the point D in the figure.

As shown in FIG. 18, in the second hydro-mechanical forward gear, the parameters are substituted into the formula (5) to obtain $n_o=(0.49e+0.75)n_e$;

when $c\in[-1, 1]$, the corresponding range is $n_o\in[0.26, 1.24]n_e$, the intersection point C is obtained by the above calculation, and the range of the second engine-power hydro-mechanical forward gear is obtained according to the intersection point and it is denoted by the segment CG in the figure, wherein $e\in[-0.96,1], n_o\in[0.28,1.24]n_e$.

When the displacement ratio of the hydraulic transmission assembly is $e=0$, the second engine-power mechanical forward gear is obtained:

the parameters are substituted into the formula (8) to obtain $n_o=0.75n_e$ which is denoted by the point F in the figure.

As shown in FIG. 18, in the engine-power hydro-mechanical reverse gear, the parameters are substituted into the formula (6) to obtain $n_o=-(0.30e4-0.46)n_e$;

when $e\in[-1,1]$, the corresponding range is $n_o\in[-0.76, -0.16]n_e$, the intersection point H is obtained by the above calculation, and the range of the engine-power hydro-mechanical reverse gear is obtained according to the intersection point and it is denoted by the segment HK in the figure, wherein $e\in[-0.94,1], [-0.76,-0.18]n_e$.

When the displacement ratio of the hydraulic transmission assembly is e=0, the engine-power mechanical reverse gear is obtained:

the parameters are substituted into the formula (9) to obtain $n_o=-0.46n_e$ which is denoted by the point J in the figure.

According to the above transmission relationships, the switching between different transmission modes is implemented by selectively controlling engagement of the clutch assembly and the brake assembly, and the switching from engine-power hydraulic transmission to engine-power hydro-mechanical transmission or from engine-power hydro-mechanical transmission to engine-power mechanical transmission is implemented by controlling the displacement ratio of the hydraulic transmission assembly. The details are as follows:

The operating mode meets the low-speed and high-torque operating requirements.

Forward traveling is realized by: the engine-power hydraulic forward gear→the first engine-power hydro-mechanical forward gear.

In the engine-power hydraulic forward gear, the first clutch $C_1$, the third clutch $C_3$, the second brake $B_2$, the fifth brake $B_5$, and the sixth brake $B_6$ are engaged, and the displacement ratio of the hydraulic transmission assembly changes within a range of (−0.61, 0), so that forward hydraulic startup is implemented.

In the first engine-power hydro-mechanical forward gear, the first clutch $C_1$, the third clutch $C_3$, the first brake $B_1$, the fourth brake $B_4$, and the sixth brake $B_6$ are engaged, and the displacement ratio of the hydraulic transmission assembly changes within a range of (−0.61, 1), so that forward hydro-mechanical traveling is implemented; and when the displacement ratio of the hydraulic transmission assembly is 0, the first engine-power mechanical forward gear is obtained, and forward mechanical traveling is implemented.

Reverse traveling is realized by: the first hydraulic reverse gear the hydro-mechanical reverse gear.

In the first engine-power hydraulic reverse gear, the first clutch $C_1$, the third clutch $C_3$, the second brake $B_2$, the fourth brake $B_4$, and the sixth brake $B_6$ are engaged, and the displacement ratio of the hydraulic transmission assembly changes within a range of (−0.94, 0), so that reverse hydraulic startup is implemented.

In the engine-power hydro-mechanical reverse gear, the first clutch $C_1$, the third clutch $C_3$, the first brake $B_1$, the fifth brake $B_5$, and the sixth brake $B_6$ are engaged, and the displacement ratio of the hydraulic transmission assembly changes within a range of (−0.94, 1), so that reverse hydro-mechanical traveling is implemented; and when the displacement ratio of the hydraulic transmission assembly is 0, the engine-power mechanical reverse gear is obtained, and reverse mechanical traveling is implemented.

The transfer mode meets the high-speed transfer requirements.

Forward traveling is realized by: the engine-power hydraulic forward gear the second engine-power hydro-mechanical forward gear.

In the engine-power hydraulic forward gear, the first clutch $C_1$, the third clutch $C_3$, the second brake $B_2$, the fifth brake $B_5$, and the sixth brake $B_5$ are engaged, and the displacement ratio of the hydraulic transmission assembly changes within a range of (−0.96, 0), so that forward hydraulic startup is implemented.

In the second engine-power hydro-mechanical forward gear, the first clutch $C_1$, the third clutch $C_3$, the fifth clutch $C_5$, the first brake and the sixth brake $B_6$ are engaged, and the displacement ratio of the hydraulic transmission assembly changes within a range of (−0.96, 1), so that forward hydro-mechanical traveling is implemented; and when the displacement ratio of the hydraulic transmission assembly 2 is 0, the second engine-power mechanical forward gear is obtained, and forward mechanical traveling is implemented.

Reverse traveling is realized by: the second engine-power hydraulic reverse gear the engine-power hydro-mechanical reverse gear.

In the second engine-power hydraulic reverse gear, the first clutch $C_1$, the third clutch $C_3$, the fifth clutch $C_5$, the second brake 32, and the sixth brake 36 are engaged, and the displacement ratio of the hydraulic transmission assembly changes within a range of (−0.58, 0); so that reverse hydraulic startup is implemented.

In the engine-power hydro-mechanical reverse gear, the first clutch $C_1$, the third clutch $C_3$, the first brake $B_1$, the fifth brake $B_5$, and the sixth brake $B_6$ are engaged, and the displacement ratio of the hydraulic transmission assembly changes within a range of (−0.58, 1), so that reverse hydro-mechanical traveling is implemented; and when the displacement ratio of the hydraulic transmission assembly is 0, the engine-power mechanical reverse gear is obtained, and reverse mechanical traveling is implemented.

When the motor serves as a power source, in motor-power mechanical forward/reverse gear, the rotation speeds of the output shaft and the motor are in the following relationship:

$$n_o = \frac{k_2(1+k_1)k_5}{(1+k_2)k_1(1+k_5)}n_m$$

wherein $n_m$ is the rotation speed of the motor;

the parameters are substituted to obtain $n_o=0.75n_m$.

Pure electric traveling can achieve zero emissions and reduce noise pollution. This mode is suitable for applications sensitive to pollution sources and effectively reduces the damages to crops during operation.

When the engine-motor hybrid power serves as a power source, engine-motor hybrid power torque coupling, engine-motor hybrid power low-speed coupling, and engine-motor hybrid power high-speed coupling are provided.

The engine-motor hybrid power torque coupling includes: an engine-motor hybrid power torque-coupling hydro-mechanical gear and an engine-motor hybrid power torque-coupling mechanical gear. The first engine-motor hybrid power torque-coupling hydro-mechanical forward gear and the first engine-motor hybrid power torque-coupling mechanical forward gear are taken as examples below to illustrate the transmission relationships.

In the first engine-motor hybrid power torque-coupling hydro-mechanical forward gear, the torques of the engine, the motor, and the output shaft are in the following relationship:

$$T_e + T_m = \frac{\left(k_2\frac{1+k_1}{k_1} + \frac{e}{i_1 i_2}\right)(k_3 k_4 - 1)k_5}{k_4(1+k_2)(1+k_3)(1+k_5)} T_o \quad (10)$$

wherein $T_e$ is the output torque of the engine, $T_m$ is the output torque of the motor, and $T_o$ is the torque of the output shaft;

the parameters are substituted to obtain $T_e+T_m=(0.19e+0.30)T_o$, when the displacement ratio of the hydraulic transmission assembly is e=0, the first engine-motor hybrid power torque-coupling mechanical forward gear is obtained.

In the first engine-motor hybrid power torque-coupling mechanical forward gear, the torques of the engine, the motor, and the output shaft are in the following relationship:

$$T_e + T_m = \frac{(k_3 k_4 - 1)k_2(1 + k_1)k_5}{k_1 k_4(1 + k_2)(1 + k_3)(1 + k_5)} T_o \qquad (11)$$

the parameters are substituted to obtain $T_e + T_m = 0.30 T_o$.

The engine-motor hybrid power low-speed coupling includes: an engine-motor hybrid power low-speed-coupling hydro-mechanical gear and an engine-motor hybrid power low-speed-coupling mechanical gear. The first engine-motor hybrid power low-speed-coupling hydro-mechanical forward gear and the first engine-motor hybrid power low-speed-coupling mechanical forward gear are taken as examples below to illustrate the transmission relationships.

In the first engine-motor hybrid power low-speed-coupling hydro-mechanical forward gear, the rotation speeds of the output shaft, the engine, and the motor/generator are in the following relationship:

$$n_o = \frac{(k_3 k_4 - 1)k_5}{k_4(1 + k_3)(1 + k_5)(1 + k_2)} \left[ \left( \frac{e}{i_1 i_2} + \frac{k_2}{k_1} + k_2 \right) n_e - \frac{k_2}{k_1} n_m \right] \qquad (12)$$

the parameters are substituted to obtain $n_o = (0.19e + 0.30) n_m$, when the displacement ratio of the hydraulic transmission assembly is e=0, the first engine-motor hybrid power low-speed-coupling mechanical forward gear is obtained.

In the first engine-motor hybrid power low-speed-coupling mechanical forward gear, the rotation speeds of the output shaft, the engine, and the motor/generator are in the following relationship:

$$n_o = \frac{k_2 k_5(k_3 k_4 - 1)[(1 + k_1)n_e - n_m]}{k_1 k_4(1 + k_2)(1 + k_3)(1 + k_5)} \qquad (13)$$

the parameters are substituted to obtain $n_o = 0.30 n_e - 0.11 n_m$.

The engine-motor hybrid power high-speed coupling includes an engine-motor hybrid power high-speed-coupling hydro-mechanical gear and an engine-motor hybrid power high-speed-coupling mechanical gear. The first engine-motor hybrid power high-speed-coupling hydro-mechanical forward gear and the first engine-motor hybrid power high-speed-coupling mechanical forward gear are taken as examples below to illustrate the transmission relationships.

In the first engine-motor hybrid power high-speed-coupling hydro-mechanical forward gear, the rotation speeds of the output shaft, the engine, and the motor are in the following relationship:

$$n_o = \frac{1}{1 + k_5} \left[ \frac{k_5(k_3 k_4 - 1)}{k_4(1 + k_3)(1 + k_2)} \left( \frac{e}{i_1 i_2} + k_2 + \frac{k_2}{k_1} \right) n_e + \frac{n_m}{i_3 i_4} \right] \qquad (14)$$

wherein $i_3$ is the transmission ratio of the front motor-power output gear pair, $i_4$ is the transmission ratio of the rear motor-power output gear pair, and if $i_3 = 0.63$ and $i_4 = 0.8$, the parameters are substituted to obtain $n_o = (0.19e + 0.30) n_e + 0.42 n_m$, when the displacement ratio of the hydraulic transmission assembly is e=0, the first engine-motor hybrid power high-speed-coupling mechanical forward gear is obtained.

In the first engine-motor hybrid power high-speed-coupling mechanical forward gear, the rotation speeds of the output shaft, the engine, and the motor are in the following relationship:

$$n_o = \frac{1}{1 + k_5} \left[ \frac{k_2 k_5(k_3 k_4 - 1)(1 + k_1)}{k_1 k_4(1 + k_2)(1 + k_3)} n_e + \frac{1}{i_3 i_4} n_m \right] \qquad (15)$$

the parameters are substituted to obtain $n_o = 0.30 n_e + 0.42 n_m$.

According to the above transmission relationships, the switching between different transmission modes is implemented by selectively controlling engagement of the clutch assembly and the brake assembly, and the switching from the engine power serving as a power source→the engine-motor hybrid power serving as a power source is implemented by controlling the displacement ratio of the hydraulic transmission assembly and the speed/torque of the motor. The details are as follows:

As for the engine-power hydro-mechanical gear→the engine-motor hybrid power torque-coupling hydro-mechanical gear, in the engine-power hydro-mechanical gear, hydro-mechanical transmission is provided between the input member and the output member by adjusting the displacement ratio of the hydraulic transmission assembly and selectively engaging the first clutch $C_1$, the third clutch $C_3$, the fifth clutch $C_5$, the first brake $B_1$, the fourth brake $B_4$, the fifth brake $B_5$, and the sixth brake $B_6$;

in the engine-motor hybrid power torque-coupling hydro-mechanical gear, based on the engine-power hydro-mechanical gear, the torque coupling of the engine and the motor is implemented by engaging the second clutch $C_2$ and adjusting the displacement ratio e of the hydraulic transmission assembly and the torque $T_m$ of the motor.

It can be seen from the formula (10) that, the torque $T_o$ of the output shaft is adjusted through the torque $T_e$ of the engine, the displacement ratio e of the hydraulic transmission assembly, and the torque $T_m$ of the motor, and a wider torque adjustment range is acquired as compared with the circumstance that the engine serves as a single power source. This switching manner is suitable for startup and accelerating situations that require a high output torque. To reach a certain acceleration of the vehicle, the controller adjusts the torque of the motor to keep the torque of the engine within a range which leads to optimal fuel economy. When the direction of the motor torque is adjusted, a part of the power of the engine can be supplied to the storage battery through the generator.

As for the engine-power hydro-mechanical gear→the engine-motor hybrid power low-speed-coupling hydro-mechanical gear, in the engine-motor hybrid power low-speed-coupling hydro-mechanical gear, based on the engine-power hydro-mechanical gear, the speed coupling of the engine and the motor is implemented by engaging the fourth clutch $C_4$, disengaging the first brake $B_1$, and adjusting the displacement ratio of the hydraulic transmission assembly and the motor speed. After that, the first engine-power hydro-mechanical forward gear can be switched to the first engine-motor hybrid power low-speed-coupling hydro-mechanical forward gear, that is, (4)→(12).

It can be seen from the formula (12) that, the rotation speed $n_o$ of the output shaft is adjusted through the rotation speed $n_e$ of the engine, the displacement ratio e of the hydraulic transmission assembly, and the rotation speed $n_m$ of the motor, and a wider rotation speed adjustment range of the output shaft is acquired as compared with the circumstance that the engine serves as a single power source. This switching is suitable for situations that require higher output power and need to overcome harsh road conditions at any time during traveling. When the vehicle travels at a low speed and demands higher output power, the controller adjusts the motor speed, the motor and the engine do external work together, and the input member and the output member are matched with an optimal transmission ratio, so that the engine speed remains within a range which leads to optimal fuel economy. When the direction of the motor speed is adjusted, a part of the power of the engine can be supplied to the storage battery through the generator.

As for the engine-power hydro-mechanical gear→the engine-motor hybrid power high-speed-coupling hydro-mechanical gear, in the engine-motor hybrid power high-speed-coupling hydro-mechanical gear, based on the engine-power hydro-mechanical gear, the speed coupling of the engine and the motor is implemented by engaging the sixth clutch $C_6$, disengaging the sixth brake $B_6$, and adjusting the displacement ratio of the hydraulic transmission assembly and the motor speed. After that, the first engine-power hydro-mechanical forward gear can be switched to the first engine-motor hybrid power high-speed-coupling hydro-mechanical forward gear, that is, (4)→(14).

It can be seen from the formula (14) that, the rotation speed $n_o$ of the output shaft is adjusted through the rotation speed $n_e$ of the engine, the displacement ratio e of the hydraulic transmission assembly, and the rotation speed $n_m$ of the motor, and a wider rotation speed adjustment range of the output shaft is acquired as compared with the circumstance that the engine serves as a single power source. This switching is suitable for situations that require higher output power and higher vehicle speeds. Because the coefficient of the motor speed in this mode is greater than that in the engine-motor hybrid power low-speed-coupling hydro-mechanical gear, higher vehicle speeds can be obtained.

As for the engine-motor hybrid power hydro-mechanical gear→the engine-motor hybrid power mechanical gear, when the displacement ratio of the hydraulic transmission assembly is e=0, the engine-motor hybrid power hydro-mechanical gear→the engine-motor hybrid power mechanical gear is implemented. Specifically, the above switching is implemented by disengaging the third clutch $C_3$, engaging the third brake $B_3$, and adjusting the speed/torque of the motor. After that, the first engine-motor hybrid power torque-coupling hydro-mechanical forward gear can be switched to the first engine-motor hybrid power torque-coupling mechanical forward gear, the first engine-motor hybrid power low-speed-coupling hydro-mechanical forward gear can be switched to the first engine-motor hybrid power low-speed-coupling mechanical forward gear, and the first engine-motor hybrid power high-speed-coupling hydro-mechanical forward gear can be switched to the first engine-motor hybrid power high-speed-coupling mechanical forward gear, that is, (10)→(11), (12)→(13), and (14)→(15).

It can be seen from the above switching relationships that the speed/torque of the output shaft and the speed/torque of the input shaft in the engine-motor hybrid power mechanical gear are jointly adjusted by the engine and the motor. The changing range of the transmission ratio is small, but the efficiency of the mechanical transmission is higher. This switching is suitable for situations that have good working conditions and require high output power.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A multi-mode continuously variable transmission with both speed coupling and torque coupling, comprising an engine-power input assembly, a hydraulic transmission assembly, a motor transmission assembly, a planetary gear assembly, an output member, a clutch assembly, and a brake assembly, wherein the planetary gear assembly at least comprises five planetary gear trains, an output end of the planetary gear assembly is connected to the output member, the clutch assembly connects the engine-power input assembly, the hydraulic transmission assembly, and the motor transmission assembly to an input end of the planetary gear assembly, and the clutch assembly connects the engine-power input assembly to the hydraulic transmission assembly; and the clutch assembly and the brake assembly provide a continuously, changing transmission ratio between the engine-power input assembly or/and the motor transmission assembly and the output member;

the planetary near assembly comprises a first planetary gear mechanism, a second planetary gear mechanism, a third planetary gear mechanism, a fourth planetary gear mechanism, and a fifth planetary gear mechanism, wherein a ring gear of the first planetary gear mechanism is connected to a ring gear of the second planetary gear mechanism; a sun gear of the second planetary gear mechanism is connected to an output end of the hydraulic transmission assembly, and a planet carrier of the second planetary gear mechanism is connected to a ring gear of the third planetary gear mechanism; the ring gear of the third planetary gear mechanism is connected to a sun gear of the fourth planetary gear mechanism, and a planet carrier of the third planetary gear mechanism is connected to a planet carrier of the fourth planetary gear mechanism; a ring gear of the fourth planetary gear mechanism is connected to a ring gear of the fifth planetary gear mechanism; and a planet carrier of the fifth planetary gear mechanism is connected to the output member.

2. The multi-mode continuously variable transmission with both speed coupling and torque coupling according to claim 1, wherein transmission modes comprising hydraulic transmission, mechanical transmission, and hydro-mechanical transmission are provided between the engine-power input assembly and the output member by adjusting a displacement ratio of the hydraulic transmission assembly and selectively controlling engagement of the clutch assembly and the brake assembly;

mechanical transmission is provided between the motor transmission assembly and the output member by selectively controlling engagement of the clutch assembly and the brake assembly;

transmission modes comprising mechanical transmission and hydro-mechanical transmission are provided between the engine-power input assembly as well as the motor transmission assembly and the output member by adjusting the displacement ratio of the hydraulic transmission assembly and selectively controlling engagement of the clutch assembly and the brake assembly.

3. The multi-mode continuously variable transmission with both speed coupling and torque coupling according to claim 2, wherein the clutch assembly comprises a second clutch and a fifth clutch, wherein the second clutch is used for selectively connecting an output end of the motor transmission assembly to a planet carrier of the first planetary gear mechanism to achieve synchronous rotation, and the fifth clutch is used for selectively connecting a sun gear of the third planetary gear mechanism to the ring gear of the third planetary gear mechanism to achieve synchronous rotation; the brake assembly comprises a first brake, a third brake, and a sixth brake, wherein the first brake is used for selectively connecting a sun gear of the first planetary gear mechanism to a fixed member, the third brake is used for selectively connecting the sun gear of the second planetary gear mechanism to the fixed member, and the sixth brake, is used for selectively connecting a sun gear of the fifth planetary gear mechanism to the fixed member;

forward or reverse mechanical transmission is provided between the motor transmission assembly and the output member by adjusting a speed/torque of a motor and selectively controlling engagement of the second clutch, the fifth clutch, the first brake, the third brake, and the sixth brake.

4. The multi-mode continuously variable transmission with both speed coupling and torque coupling according to claim 3, wherein the clutch assembly further comprises a first clutch and a third clutch, wherein the first clutch is used for selectively connecting an output end of the engine-power input assembly to the planet carrier of the first planetary gear mechanism to achieve synchronous rotation, and the third clutch is used for selectively connecting the output end of the engine-power input assembly to an input end of the hydraulic transmission assembly to achieve synchronous rotation; the brake assembly further comprises a second brake, a fourth brake, and a fifth brake, wherein the second brake is used for selectively connecting the ring gear of the first planetary gear mechanism to the fixed member, the fourth brake is used for selectively connecting the sun gear of the third planetary gear mechanism to the fixed member, and the fifth brake is used for selectively connecting the planet carrier of the third planetary gear mechanism to the fixed member;

forward hydraulic transmission is provided between the engine-power input assembly and the output member by adjusting the displacement ratio of the hydraulic transmission assembly and engaging the first clutch, the third clutch, the second brake, the fifth brake, and the sixth brake;

reverse hydraulic transmission is provided between the engine-power input assembly and the output member by adjusting the displacement ratio of the hydraulic transmission assembly and engaging the first clutch, the third clutch, the second brake, the fourth brake, and the sixth brake, or engaging the first clutch, the third clutch, the fifth clutch, the second brake, and the sixth brake;

different forward hydro-mechanical transmission is provided between the engine-power input assembly and the output member by adjusting the displacement ratio of the hydraulic transmission assembly and engaging the first clutch, the third clutch the first brake the fourth brake, and the sixth brake, or engaging the first clutch the third clutch, the fifth clutch, the first brake and the sixth brake;

reverse hydro-mechanical transmission is provided between the engine-power input assembly and the output member by adjusting the displacement ratio of the hydraulic transmission assembly and engaging the first clutch, the third clutch, the first brake, the fifth brake, and the sixth brake;

different forward mechanical transmission is provided between the engine-power input assembly and the output member by engaging the first clutch, the first brake, the third brake, the fourth brake, and the sixth brake, or engaging the first clutch, the fifth clutch, the first brake, the third brake, and the sixth brake;

reverse mechanical transmission is provided between the engine-power input assembly and the output member by engaging the first clutch, the first brake, the third brake, the fifth brake, and the sixth brake.

5. The multi-mode continuously variable transmission with both speed coupling and torque coupling according to claim 4, wherein different forward torque coupling-hydro-mechanical transmission is provided between the engine-power input assembly as well as the motor transmission assembly and the output member by adjusting the displacement ratio of the hydraulic transmission assembly and torque of the motor and engaging the first clutch, the second clutch, the third clutch, the first brake, the fourth brake, and the sixth brake, or engaging the first clutch, the second clutch, the third clutch, the fifth clutch, the first brake, and the sixth brake;

reverse torque coupling-hydro-mechanical transmission is provided between the engine-power input assembly as well as the motor transmission assembly and the output member by adjusting the displacement ratio of the hydraulic transmission assembly and the torque of the motor and engaging the first clutch, the second clutch, the third clutch, the first brake, the fifth brake, and the sixth brake;

different forward torque coupling-mechanical transmission is provided between the engine-power input assembly as well as the motor transmission assembly and the output member by adjusting the torque of the motor and engaging the first clutch, the second clutch, the first brake, the third brake, the fourth brake, and the sixth brake, or engaging the first clutch, the second clutch, the fifth clutch, the first brake, the third brake, and the sixth brake;

reverse torque coupling-mechanical transmission is provided between the engine-power input assembly as well as the motor transmission assembly and the output member by adjusting the torque of the motor and engaging the first clutch, the second clutch, the first brake, the third brake, the fifth brake, and the sixth brake.

6. The multi-mode continuously variable transmission with both speed coupling and torque coupling according to claim 4, wherein the clutch assembly further comprises a fourth clutch, wherein the fourth clutch is used for selectively connecting the output end of the motor transmission assembly to the sun gear of the first planetary gear mechanism to achieve synchronous rotation;

different forward low-speed coupling-hydro-mechanical transmission is provided between the engine-power input assembly as well as the motor transmission assembly and the output member by adjusting the displacement ratio of the hydraulic transmission assembly and a speed of the motor and engaging the first clutch, the third clutch, the fourth clutch, the fourth brake, and the sixth brake, or engaging the first clutch, the third clutch, the fourth clutch, the fifth clutch, and the sixth brake;

reverse low-speed coupling-hydro-mechanical transmission is provided between the engine-power input assembly as well as the motor transmission assembly and the output member by adjusting the displacement ratio of the hydraulic transmission assembly and the speed of the motor and engaging the first clutch, the third clutch, the fourth clutch, the fifth brake, and the sixth brake;

different forward low-speed coupling-mechanical transmission is provided between the engine-power input assembly as well as the motor transmission assembly and the output member by adjusting the speed of the motor and engaging the first clutch, the fourth clutch, the third brake, the fourth brake, and the sixth brake, or engaging the first clutch, the fourth clutch, the fifth clutch, the third brake, and the sixth brake;

reverse low-speed coupling-mechanical transmission is provided between the engine-power input assembly as well as the motor transmission assembly and the output member by adjusting the speed of the motor and engaging the first clutch, the fourth clutch, the third brake, the fifth brake, and the sixth brake.

7. The multi-mode continuously variable transmission with both speed coupling and torque coupling according to claim 4, wherein the clutch assembly further comprises a sixth clutch, wherein the sixth clutch is used for selectively connecting the output end of the motor transmission assembly to the sun gear of the fifth planetary gear mechanism to achieve synchronous rotation;

different forward high-speed coupling-hydro-mechanical transmission is provided between the engine-power input assembly as well as the motor transmission assembly and the output member by adjusting the displacement ratio of the hydraulic transmission assembly and a speed of the motor and engaging the first clutch, the third clutch, the sixth clutch, the first brake, and the fourth brake, or engaging the first clutch, the third clutch, the fifth clutch, the sixth clutch, and the first brake;

reverse high-speed coupling-hydro-mechanical transmission is provided between the engine-power input assembly as well as the motor transmission assembly and the output member by adjusting the displacement ratio of the hydraulic transmission assembly and the speed of the motor and engaging the first clutch, the third clutch, the sixth clutch, the first brake, and the fifth brake;

different forward high-speed coupling-mechanical transmission is provided between the engine-power input assembly as well as the motor transmission assembly and the output member by adjusting the speed of the motor and engaging the first clutch, the sixth clutch, the first brake, the third brake, and the fourth brake, or engaging the first clutch, the fifth clutch, the sixth clutch, the first brake, and the third brake;

reverse high-speed coupling-mechanical transmission is provided between the engine-power input assembly as well as the motor transmission assembly and the output member by adjusting the speed of the motor and engaging the first clutch, the sixth clutch $C_6$ (3-8), the first brake, the third brake, and the fifth brake.

8. The multi-mode continuously variable transmission with both speed coupling and torque coupling according to claim 2, wherein hydro-mechanical transmission between the engine-power input assembly and the output member is capable of being synchronously switched to hydro-mechanical transmission between the engine-power input assembly as well as the motor transmission assembly and the output member;

hydro-mechanical transmission between the engine-power input assembly ROA as well as the motor transmission assembly and the output member is capable of being synchronously switched to mechanical transmission between the engine-power input assembly as well as the motor transmission assembly and the output member;

hydraulic transmission between the engine-power input assembly and the output member is capable of being synchronously switched to hydro-mechanical transmission between the engine-power input assembly and the output member, and hydro-mechanical transmission between the engine-power input assembly and the output member is capable of being synchronously switched to mechanical transmission between the engine-power input assembly and the output member.

* * * * *